US012719657B2

(12) United States Patent
Hoshizuki et al.

(10) Patent No.: US 12,719,657 B2
(45) Date of Patent: Aug. 25, 2026

(54) ENCRYPTION PROCESSING DEVICE AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 339 days.

(21) Appl. No.: 18/479,307

(22) Filed: Oct. 2, 2023

(65) Prior Publication Data

US 2024/0129107 A1 Apr. 18, 2024

(30) Foreign Application Priority Data

Oct. 3, 2022 (JP) ................................ 2022-159634

(51) Int. Cl.
*H04L 9/00* (2022.01)
*H04L 9/06* (2006.01)

(52) U.S. Cl.
CPC ........... *H04L 9/008* (2013.01); *H04L 9/0618* (2013.01)

(58) Field of Classification Search
CPC ..... H04L 9/008; H04L 9/0618; H04L 9/3093; H04L 2209/008
See application file for complete search history.

(56) References Cited

U.S. PATENT DOCUMENTS 11,637,700 B2 * 4/2023 Kang ..................... H04L 9/008 713/168
2015/0312028 A1 * 10/2015 Cheon .................... H04L 9/008 713/189
2019/0363871 A1 * 11/2019 Cheon ..................... H04L 9/008
2021/0351912 A1 * 11/2021 No .......................... H04L 9/008
2021/0351913 A1 * 11/2021 No .......................... H04L 9/008

OTHER PUBLICATIONS

Chillotti, I. et al., "TFHE: Fast Fully Homomorphic Encryption over the Torus," *Journal of Cryptology,* 33:34-91, 2020, 62 pages.
Okada, H. et al., "Integerwise Functional Bootstrapping on TFHE," *Isc 2020. Lecture Notes in Computer Science,* vol. 12472, Springer, Cham, First Online: Nov. 25, 2020, pp. 107-125; https://doi.org/10.1007/978-3-030-62974-8_7.
Micciancio, D. et al., "Bootstrapping in FHEW-like Cryptosystems," *Duality Technologies,* Aug. 27, 2020, 25 pages.

* cited by examiner

*Primary Examiner* — Vu V Tran
(74) *Attorney, Agent, or Firm* — MASUVALLEY & PARTNERS; Peter Martinez

(57) ABSTRACT

A fully homomorphic encryption processing device processing a ciphertext is disclosed, the ciphertext has an integer as a plaintext. The encryption processing device includes a processor that executes a process including: obtaining a ciphertext by using a first polynomial and a second polynomial respectively including a second function and a third function, the second function and the third function being generated by decomposing a first function as a calculation object. The processor also applies the first polynomial to a first ciphertext to obtain a second ciphertext. The processor further applies the second polynomial to a ciphertext obtained by calculation based on applying a predetermined polynomial to the first ciphertext to obtain a third ciphertext. The processor performs a homomorphic operation using the second ciphertext and the third ciphertext to obtain a fourth ciphertext corresponding to a result of calculation of the first function which uses the first ciphertext as input.

12 Claims, 13 Drawing Sheets

FIG.2A
〈ODD FUNCTION〉
(a-1)
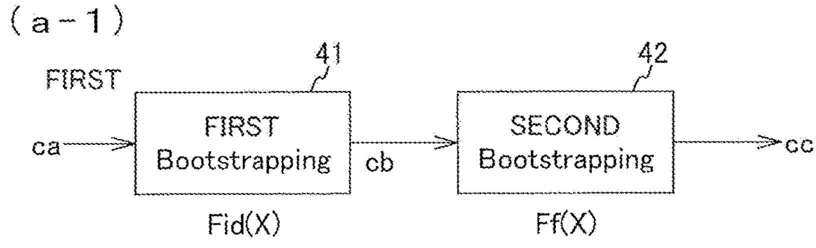
(a-2)
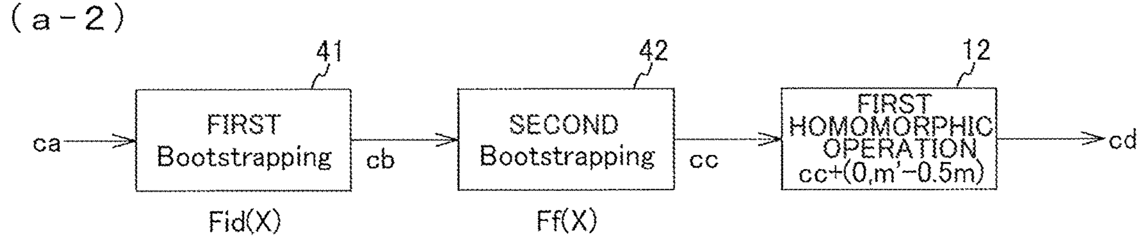
(a-3)
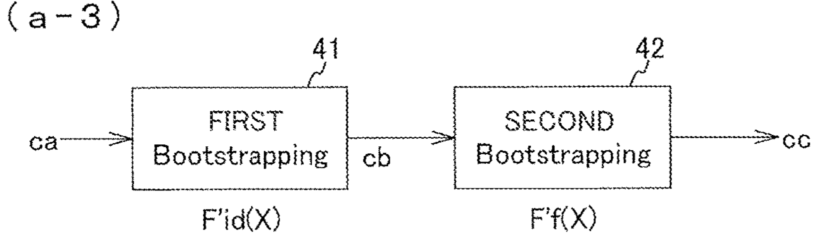
FIG.2B
〈EVEN FUNCTION〉
(b-1)
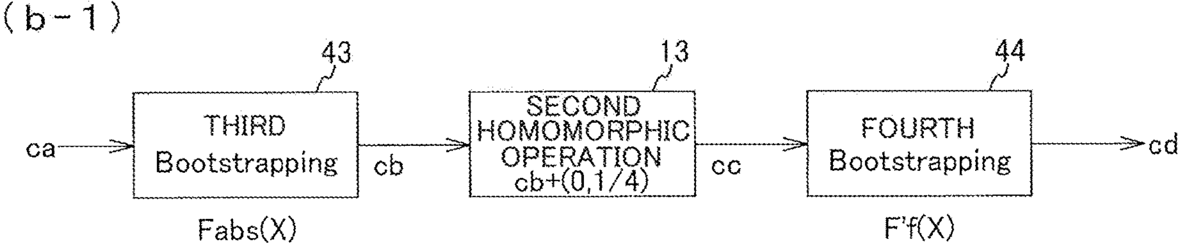
(b-2)
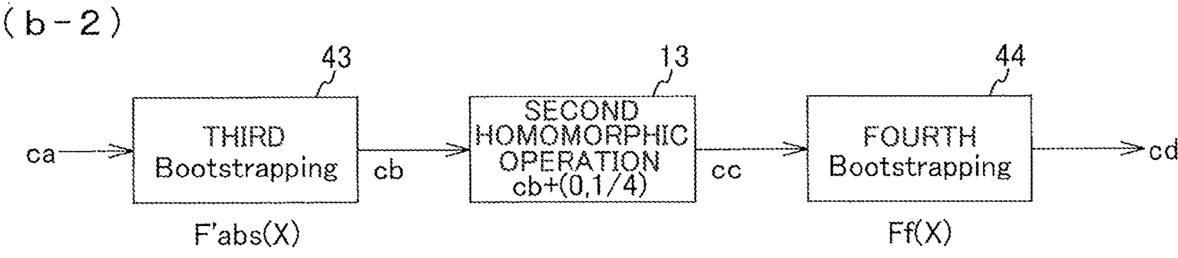

OFFSET ADDED

NO OFFSET ADDED

| a(INTEGER REPRESENTATION) | -4 | -3 | -2 | -1 | 0 | 1 | 2 | 3 |
|---|---|---|---|---|---|---|---|---|
| b(CIRCLE GROUP) | -(-4/20) | -(-2/20) | -(0/20) | -(2/20) | -4/20 | -2/20 | 0/20 | 2/20 |
| b+5/20 | 9/20 | 7/20 | 5/20 | 3/20 | 1/20 | 3/20 | 5/20 | 7/20 |
| b+5/20(INTEGER REPRESENTATION) | 4 | 3 | 2 | 1 | 0 | 1 | 2 | 3 |

| a(INTEGER REPRESENTATION) | -4 | -3 | -2 | -1 | 0 | 1 | 2 | 3 |
|---|---|---|---|---|---|---|---|---|
| b(CIRCLE GROUP) | -(-3/16) | -(-1/16) | -(1/16) | -(3/16) | -3/16 | -1/16 | 1/16 | 3/16 |
| b+4/16 | 7/16 | 5/16 | 3/16 | 1/16 | 1/16 | 3/16 | 5/16 | 7/16 |
| b+4/16(SYMBOL) | 3.5 | 2.5 | 1.5 | 0.5 | 0.5 | 1.5 | 2.5 | 3.5 |

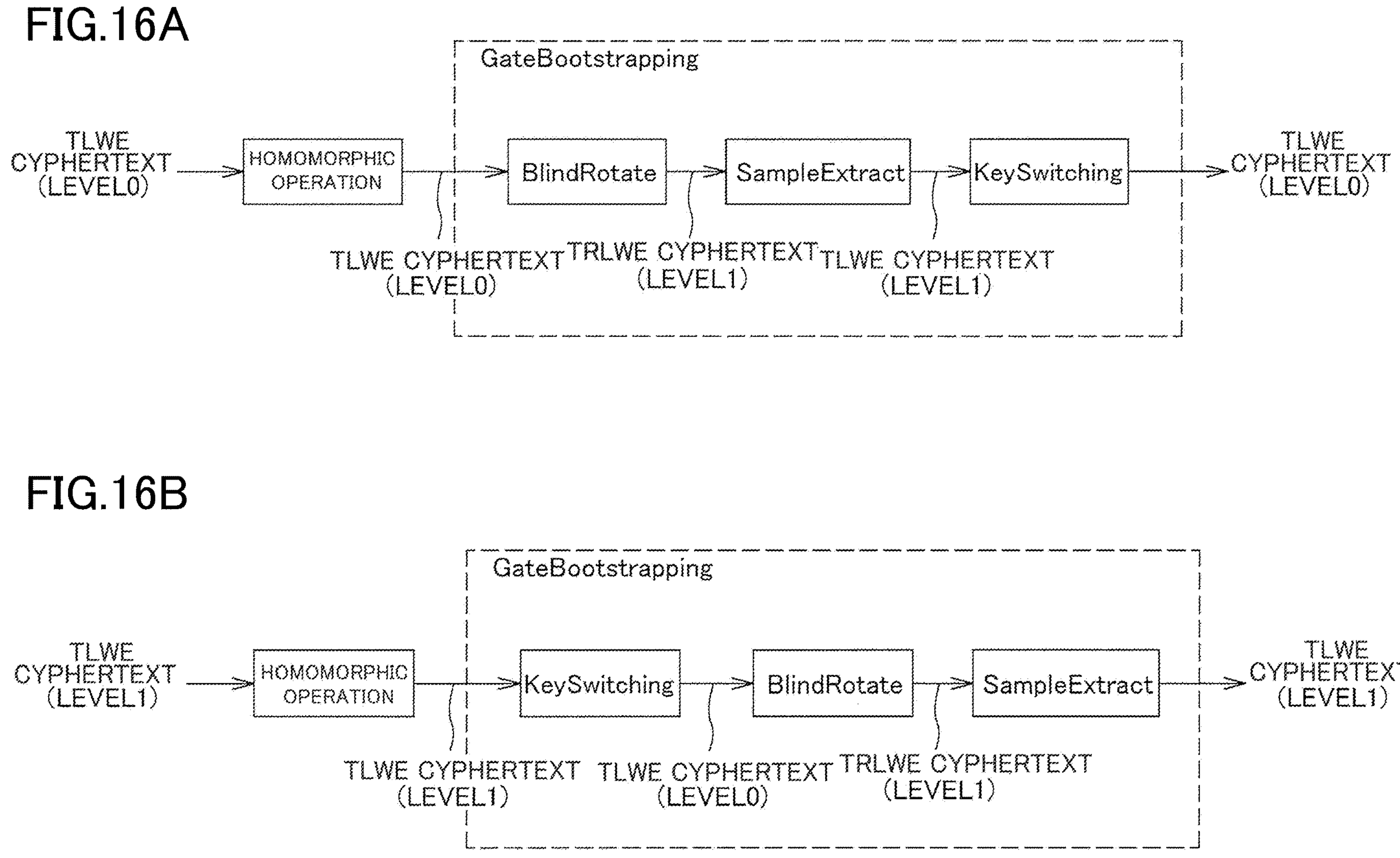
FIG.16A
GateBootstrapping
TLWE CYPHERTEXT (LEVEL0)
HOMOMORPHIC OPERATION
BlindRotate
SampleExtract
KeySwitching
TLWE CYPHERTEXT (LEVEL0)
TLWE CYPHERTEXT (LEVEL0)
TRLWE CYPHERTEXT (LEVEL1)
TLWE CYPHERTEXT (LEVEL1)
FIG.16B
GateBootstrapping
TLWE CYPHERTEXT (LEVEL1)
HOMOMORPHIC OPERATION
KeySwitching
BlindRotate
SampleExtract
TLWE CYPHERTEXT (LEVEL1)
TLWE CYPHERTEXT (LEVEL1)
TLWE CYPHERTEXT (LEVEL0)
TRLWE CYPHERTEXT (LEVEL1)

ENCRYPTION PROCESSING DEVICE AND ENCRYPTION PROCESSING METHOD

CROSS-REFERENCE TO RELATED APPLICATION

This application is based upon and claims the benefit of priority to Japanese Patent Application No. 2022-159634, filed on Oct. 3, 2022, with the Japanese Patent Office, the entire contents of which are incorporated herein by reference in its entirety.

FIELD

The embodiments discussed herein are related to an encryption processing device and an encryption processing method.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are conventionally known additive homomorphic encryption that performs only an additive operation (addition and subtraction) while a finite cyclic group is regarded as an integer and multiplicative homomorphic encryption that performs only a multiplicative operation (multiplication) while a finite cyclic group is regarded as an integer.

For the finite cyclic group, an integral multiple can be obtained by repeating addition, and therefore an integral multiple by a plaintext can be calculated. Also, exponentiation by a plaintext can be calculated by repeating multiplication.

There are also known ring homomorphic encryption that processes both an additive operation and a multiplicative operation while ciphertexts remain encrypted and fully homomorphic encryption (FHE) that can perform all operations including addition and multiplication.

One of known fully homomorphic encryption techniques is fully homomorphic encryption based on the LWE (Learning with Errors) problem, which is configured by adding a small error to a plaintext in an encryption process to such an extent that there is no problem in decryption.

In the fully homomorphic encryption based on the LWE problem, an error is accumulated as an operation is repeated, and therefore, bootstrapping for reducing an error component while the error component remains encrypted is performed before the error becomes too large to allow decryption.

The computation time of bootstrapping occupies most of the computation time included in fully homomorphic encryption. Further, the amount of computation is large in bootstrapping, because bootstrapping handles a large amount of data. Therefore, in an operation of fully homomorphic encryption, the operation result may not be able to be obtained within a practical time.

A scheme that drastically improves this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "Chillotti et al., 2020" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Chillotti et al., 2020 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as the plaintext. For example, Integerwise Functional Boostrapping on TFHE, 2020, Hiroki Okada, Shinsaku Kiyomoto, and Carlos Cid can be mentioned.

If TFHE is used as the Integer-wise type, one cyphertext can retain a plurality of bits of information, thus enabling a more complicated operation to be performed in one homomorphic operation. The number of operation times in the entire system can thus be reduced largely.

Further, it is known that values of functions are substituted into a test vector polynomial for Bootstrapping and used as a LUT, whereby a desired univariate function can be evaluated. For example, Bootstrapping in FHEW-like Cryptosystems, 2020, Daniele Micciancio and Yuriy Polyakov (hereinafter, referred to as Micciancio and Polyakov, 2020) can be mentioned.

However, the function substituted into the test vector polynomial has to satisfy the property of $f(v+\frac{1}{2})=-f(v)$. Although functions satisfying this constraint include a trigonometric function, this constraint is not a general constraint, and the application thereof is difficult.

To avoid this constraint, an idea has been proposed that only the section from 0 to 0.5 on a circle group is used as a plaintext. By adding this constraint, it is possible to evaluate any univariate function regardless of the above constraint. In this case, however, information that can be retained by one ciphertext is reduced to substantially a half, i.e., by 1 bit, and the effect to be obtained by use of Integer-wise type is reduced.

SUMMARY

According to an aspect of the embodiments, an encryption processing device processes a ciphertext, the ciphertext being a fully homomorphic ciphertext that has a value obtained by adding an error with a predetermined variance to a predetermined value, as a plaintext associated with an integer and that enables a predetermined operation between integers without decryption. The encryption processing device includes a processor that executes a process including: obtaining a ciphertext by using a first polynomial and a second polynomial respectively including a second function and a third function, the second function and the third function being generated by decomposing a first function as a calculation object. The processor also applies the first polynomial to a first ciphertext to obtain a second ciphertext. The processor further applies the second polynomial to a ciphertext obtained by calculation based on applying a predetermined polynomial to the first ciphertext to obtain a third ciphertext. The processor performs a homomorphic operation using the second ciphertext and the third ciphertext to obtain a fourth ciphertext corresponding to a result of calculation of the first function which uses the first ciphertext as input.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIGS. 2A and 2B are explanatory diagrams of an operation process based on the functional configuration in FIG. 1;

FIGS. 16A and 16B are diagrams illustrating ciphertexts input to and output from Gate Bootstrapping according to the present embodiment.

DESCRIPTION OF EMBODIMENTS

Embodiments of the present invention are described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value operation.

Figure 1:
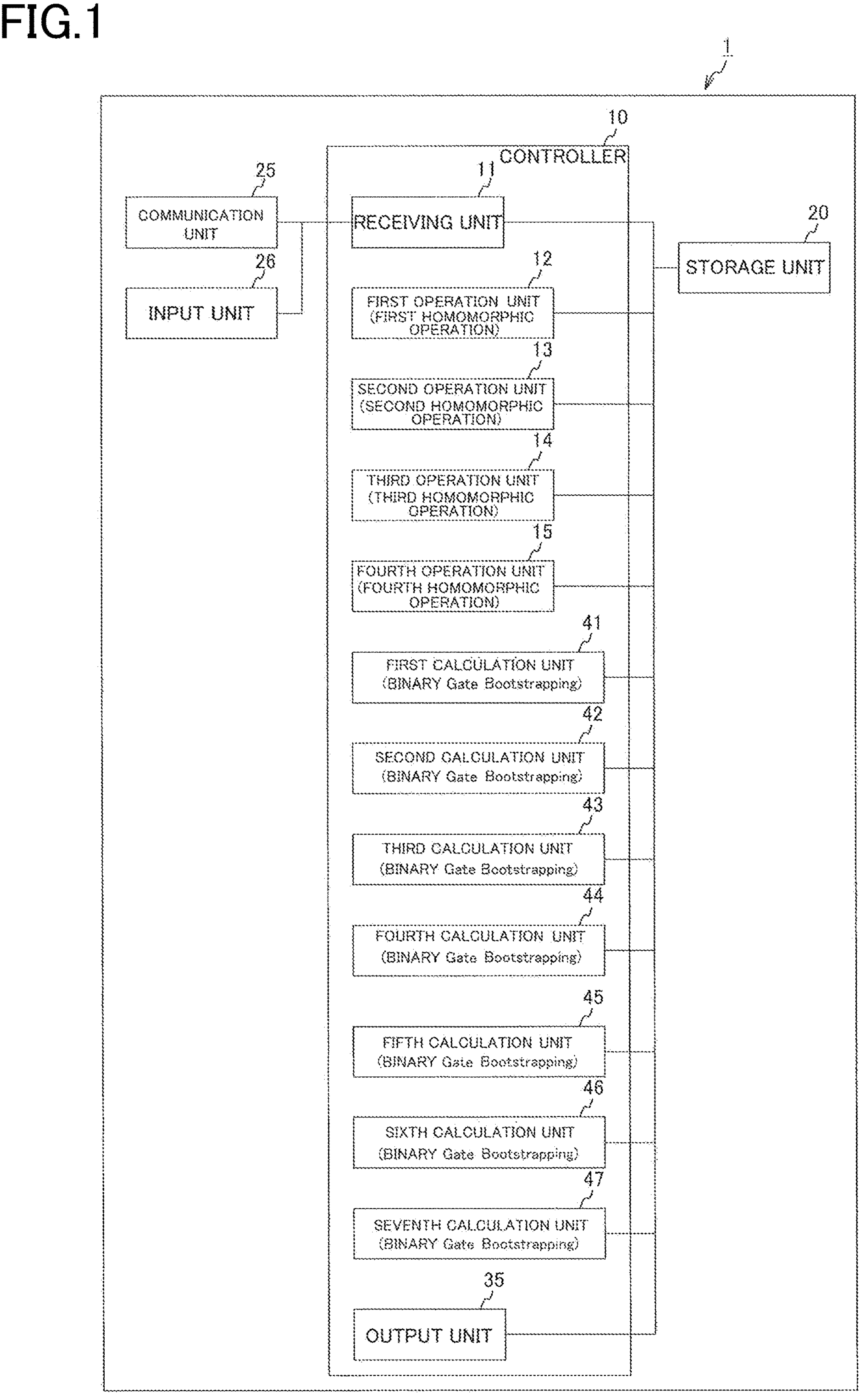
FIG. 1 is an explanatory diagram of a functional configuration of an encryption processing device of the present embodiment.

FIG. 1 is an explanatory diagram of a functional configuration of an encryption processing device of the present embodiment.

An encryption processing device 1 includes a controller 10, a storage unit 20, a communication unit 25, and an input unit 26.

The controller 10 includes a receiving unit 11, a first operation unit 12, a second operation unit 13, a third operation unit 14, and a fourth operation unit 15.

The controller 10 also includes a first Bootstrapping unit (calculation unit) 41, a second Bootstrapping unit (calculation unit) 42, a third Bootstrapping unit (calculation unit) 43, a fourth Bootstrapping unit (calculation unit) 44, a fifth Bootstrapping unit (calculation unit) 45, a sixth Bootstrapping unit (calculation unit) 46, a seventh Bootstrapping unit (calculation unit) 47, and an output unit 35.

The receiving unit 11 receives input of a ciphertext that is an object of an operation, via the communication unit 25 or the input unit 26. Alternatively, the receiving unit 11 receives input of a ciphertext from another process executed by the encryption processing device 1.

In calculation of an odd function as a univariate function, the first Bootstrapping unit 41 performs first Gate Bootstrapping for the input ciphertext.

The second Bootstrapping unit 42 performs second Gate Bootstrapping for the ciphertext output from the first Bootstrapping unit 41.

The first operation unit 12 performs a first homomorphic operation for the ciphertext output from the second Bootstrapping unit 42.

In calculation of an even function as a univariate function, the third Bootstrapping unit 43 performs third Gate Bootstrapping for the input ciphertext.

The second operation unit 13 performs a second homomorphic operation for the ciphertext output from the third Bootstrapping unit 43.

The fourth Bootstrapping unit 44 performs fourth Gate Bootstrapping for the ciphertext output from the second operation unit 13.

The third operation unit 14, the fourth operation unit 15, the fifth Bootstrapping unit 45, the sixth Bootstrapping unit 46, and the seventh Bootstrapping unit 47 are related to a method of calculating any univariate function that will be described in detail later with reference to FIG. 14.

The fifth Bootstrapping unit 45 performs fifth Bootstrapping for an input ciphertext.

The sixth Bootstrapping unit 46 performs sixth Bootstrapping for an input ciphertext.

The third operation unit 14 performs a homomorphic operation between the ciphertext output from the sixth Bootstrapping unit 46 and an input ciphertext.

The seventh Bootstrapping unit 47 performs seventh Bootstrapping for the result of the operation by the third operation unit 14.

The fourth operation unit 15 performs a homomorphic operation between the ciphertexts respectively output from the fifth Bootstrapping unit 45 and the seventh Bootstrapping unit 47.

The first operation unit 12, the second operation unit 13, the third operation unit 14, and the fourth operation unit 15 are arithmetic processing units that implement homomorphic operations described below by software.

The first Bootstrapping unit 41, the second Bootstrapping unit 42, the third Bootstrapping unit 43, and the fourth Bootstrapping unit 44, the fifth Bootstrapping unit 45, the sixth Bootstrapping unit 46 and the seventh Bootstrapping unit 47 are arithmetic processing units that implement Gate Bootstrapping processes described below by software.

At least one of the first operation unit 12, the second operation unit 13, the third operation unit 14, the fourth operation unit 15, the first Bootstrapping unit 41, the second Bootstrapping unit 42, the third Bootstrapping unit 43, the fourth Bootstrapping unit 44, the fifth Bootstrapping unit 45, the sixth Bootstrapping unit 46, the seventh Bootstrapping unit 47, and the output unit 35 may be implemented by hardware.

The output unit 35 outputs a final operation result to outside of the encryption processing device 1 or to another processing process executed by the encryption processing device 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing device 1 to a network, thereby enabling communication between the encryption processing device 1 and an external device to be performed.

The encryption processing device 1 can serve as a database server by storing the encrypted encryption database 60 in the storage unit 20 and including the communication unit 25.

In this case, the encryption processing device 1 can receive an encrypted query from a terminal device as the external device, search the encrypted encryption database 60, and send an encrypted search result to the terminal device.

The input unit 26 inputs a ciphertext that is an object of arithmetic processing and a query for the encrypted database 60, to the encryption processing device 1.

FIGS. 2A and 2B are explanatory diagrams of operation processes based on the functional configuration in FIG. 1.

The configurations illustrated in FIGS. 2A and 2B use Gate Bootstrapping presented in the aforementioned paper. Gate Bootstrapping in TFHE presented in the aforementioned paper will be described in detail below.

The encryption processing device 1 calculates an odd function and an even function for an Integer-wise type TLWE ciphertext, as described above.

A TLWE ciphertext ca is a ciphertext of a plaintext integer a for which calculation of an odd function and calculation of an even function are to be performed.

In FIG. 2A, the encryption processing device 1 performs calculation of an odd function as a univariate function.

In (a-1), the encryption processing device 1 inputs the TLWE ciphertext ca to the first Bootstrapping unit 41 and performs the first Bootstrapping using a univariate function $F_{id}(X)$ as a test vector, thereby obtaining a TLWE ciphertext cb.

The encryption processing device 1 then inputs the ciphertext cb to the second Bootstrapping unit 42 and performs the second Bootstrapping using a univariate function $F_f(X)$ as a test vector, thereby obtaining a ciphertext cc corresponding to the result of calculation of an odd function.

In (a-2), the encryption processing device 1 inputs the TLWE ciphertext ca to the first Bootstrapping unit 41 and performs the first Bootstrapping using the univariate function $F_{id}(X)$ as a test vector, thereby obtaining the TLWE ciphertext cb.

The encryption processing device 1 inputs the ciphertext cb to the second Bootstrapping unit 42 and performs the second Bootstrapping using the univariate function $F_f(X)$ as a test vector, thereby obtaining the ciphertext cc. The encryption processing device 1 then inputs the ciphertext cc to the first operation unit 12 and performs the first homomorphic operation to obtain a new ciphertext cd corresponding to the result of calculation of an odd function.

In (a-3), the encryption processing device 1 inputs the TLWE ciphertext ca to the first Bootstrapping unit 41 and performs the first Bootstrapping using a univariate function $F'_{id}(X)$ as a test vector, thereby obtaining the TLWE ciphertext cb.

The encryption processing device 1 inputs the ciphertext cb to the second Bootstrapping unit 42 and performs the second Bootstrapping using a univariate function $F'_f(X)$ as a test vector, thereby obtaining the ciphertext cc corresponding to the result of calculation of an odd function.

In FIG. 2B, the encryption processing device 1 performs calculation of an even function as a univariate function.

In (b-1), the encryption processing device 1 inputs the TLWE ciphertext ca to the third Bootstrapping unit 43 and performs the third Bootstrapping using a univariate function $F_{abs}(X)$ as a test vector, thereby obtaining the TLWE ciphertext cb.

The encryption processing device 1 inputs the ciphertext cb to the second operation unit 13 and performs the second homomorphic operation to obtain the TLWE ciphertext cc.

The encryption processing device 1 inputs the ciphertext cc to the fourth Bootstrapping unit 44 and performs the fourth Bootstrapping using the univariate function $F'_f(X)$ as a text vector, thereby obtaining the ciphertext cd corresponding to the result of calculation of an even function.

In (b-2), the encryption processing device 1 inputs the TLWE ciphertext ca to the third Bootstrapping unit 43 and performs the third Bootstrapping using a univariate function $F'_{abs}(X)$ as a test vector, thereby obtaining the TLWE ciphertext cb. The encryption processing device 1 inputs the ciphertext cb to the second operation unit 13 and performs the second homomorphic operation to obtain the TLWE ciphertext cc.

The encryption processing device 1 inputs the ciphertext cc to the fourth Bootstrapping unit 44 and performs the fourth Bootstrapping using the univariate function $F_f(X)$ as a test vector, thereby obtaining the ciphertext cd corresponding to the result of calculation of an even function.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition and multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 3:
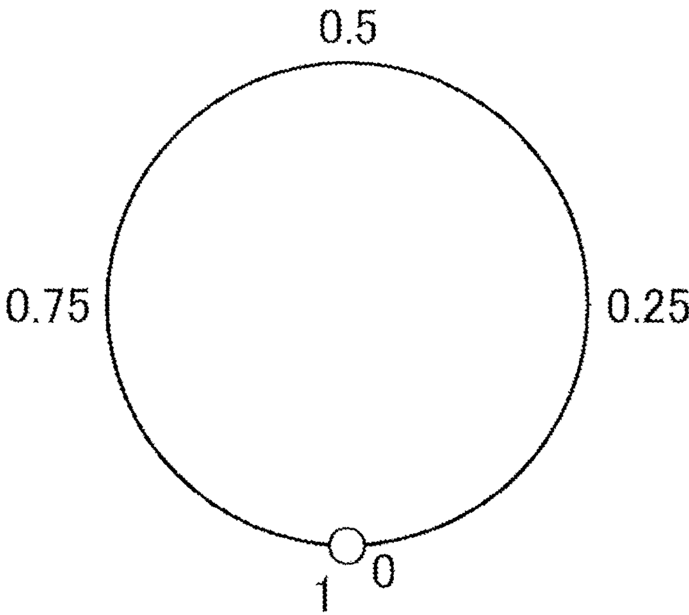
FIG. 3 is an image diagram for explaining a circle group that TLWE encryption has as a plaintext.

FIG. 3 is an image diagram for explaining a circle group that TLWE encryption has as a plaintext.

TLWE encryption has any point on a circle group {T} illustrated in FIG. 3, which moves from 0 to 1 with a real number precision and, when reaching 1, returns to 0, and uses a range near 0 (including an error) and a range near $\mu$ (including an error) as a plaintext.

The point on the circle group {T} is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] in which N random numbers uniformly distributed are collected is prepared as an element on the circle group {T}. In addition, a private key [s] in which N values each being 0 or 1 are collected is prepared.

Assuming that a random number in the Gaussian distribution (the normal distribution) in which an average value is a plaintext $\mu$ and a variance is preset to $\alpha$ is e, an example of a TLWE ciphertext is a pair ([a], [s]·[a]+e).

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s$(([a], b))=b−[s]·[a]=e is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $\varphi_s$(([a]+[a'], b+b'))=(b+b')−[s]·([a]+[a'])=(b−[s]·[a])+(b'−[s]·[a.'])=$\varphi_s$([a], b)+$\varphi_s$([a'], b'). It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a "trivial ciphertext" such as ([0], $\mu$) is a TLWE ciphertext that can be decrypted with any private key, that is, a ciphertext that can be decrypted with any private key to provide the same plaintext.

In ([0], $\mu$), [0] represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext ([0], $\mu$), the private key [s] is multiplied by the zero vector [0] to disappear as represented by $\varphi_s$(([0], $\mu$))=$\mu$−[s]·0=$\mu$. The plaintext $\mu$ is thus obtained easily. Such a ciphertext is a trivial ciphertext with regard to the plaintext $\mu$.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th order polynomial is generally represented by $a_n x^n + a_{n-1} x^{n-1} + \ldots + a_0$.

These all sets form a commutative group for the sum f(x)+g(x) of polynomials.

Further, the product f(x)g(x) of polynomials has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined by regarding polynomials as elements, a "ring" is formed, which is called a polynomial ring.

TFHE uses a polynomial ring including the circle group {T} as coefficients, and such a polynomial ring is represented as T[X].

When a polynomial T(X), which is a polynomial ring, is decomposed into $T[X](X^n+1)+T[X]$, and only remainders are extracted and collected, a factor ring of a polynomial ring is obtained because the remainders also form a "ring".

In TFHE, the factor ring of a polynomial ring is represented as $T[X]/(X^n+1)$.

A polynomial $F(X)=\mu X^{n-1}+\mu X^{n-2}+ \ldots +\mu X+\mu$ is extracted by using a desired coefficient $\mu$ ($\mu$ belongs to T) as an element of the factor ring of the polynomial ring $T[X]/(X^n+1)$.

When the element F(X) of the factor ring of the polynomial ring is multiplied by X, $\mu X^{n-1}+\mu X^{n-2}+ \ldots +\mu X-\mu$ is obtained, and the coefficient of the top term appears as a constant term with a sign reversed from positive to negative.

When multiplication by X is further performed, the same phenomenon happens again as represented by $\mu X^{n-1}+\mu X^{n-2}+ \ldots +\mu X^2-\mu X-\mu$ (the coefficient of the top term appears as a constant term with a sign reversed from positive to negative).

When this multiplication is repeated n times, $-\mu X^{n-1}-\mu X^{n-2} \ldots -\mu X-\mu$ is obtained, so that the coefficients of all terms become negative.

When multiplication by X is further continued, the coefficient of the top term becomes positive from negative and appears as a constant term as represented by $$-\mu X^{n-1}-\mu X^{n-2} \ldots -\mu X+\mu,$$

$$-\mu X^{n-1}-\mu X^{n-2} \ldots +\mu X+\mu,$$

When multiplication by X is repeated 2n times in total, the multiplication result returns to the original element of the factor ring of the polynomial ring $F(X)=\mu X^{n-1}+\mu X^{n-2}+ \ldots +\mu X+\mu$. As described above, the highest-order coefficient ($\mu$) appears as the lowest-order constant term with a reversed sign ($-\mu$), and terms are shifted by one in whole.

That is, the polynomial $F(X)=\mu X^{n-1}+\mu X^{n-2}+ \ldots +\mu X+\mu$ is a finite cyclic group of order 2n in a ring that is the factor ring of the polynomial ring $T[X]/(X^n+1)$.

In TFHE, an encryption processing device achieves fully homomorphic encryption by using such properties of the polynomial F(X) based on a factor ring of a polynomial ring.

Regardless of whether the exponential part of X is positive or negative, when the element F(X) of the factor ring of the polynomial ring is repeatedly multiplied by X n times, the signs of all the terms are reversed, and when this multiplication is repeated 2n times, the signs of all the terms return to the original signs.

Further, multiplication by $X^{-1}$ is an inverse operation of multiplication by X. Therefore, when multiplication by $X^{-1}$ is repeated, change opposite to that occurring when multiplication by X is performed. That is, when multiplication by $X^{-1}$ is performed n times, the signs of all the terms are reversed, and when this multiplication is performed 2n times, the signs of all the terms return to the original signs.

From the above facts, when the element F(X) of the factor ring of the polynomial ring is repeatedly multiplied by X or $X^{-1}$ n times, the signs of all the terms are reversed, and when this multiplication is repeated 2n times, the signs of all the terms return to the original signs.

When attention is paid on the fact that in this cyclic group, rotation can be done in both directions, the phrases of repeating multiplication −n times and repeating multiplication −2n times may be used, for the sake of convenience.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of the polynomial ring $T[X]/(X^n+1)$ described above.

In order to obtain TRLWE encryption, elements of the factor ring of the polynomial ring $T[X]/(X^n+1)$ are selected at random.

In fact, n coefficients in an (n−1)th order polynomial are selected as uniformly distributed random numbers from the circle group {T}.

When the order of the polynomial is n−1, the polynomial is not divided by $X^n+1$, and it is not necessary to consider a remainder. Therefore, it is assumed that the (n−1)th order polynomial is a polynomial a(X).

A polynomial s(X) used as a private key described below is structured as follows, by collecting n values each being 0 or 1 at random.

$$s(X)=s_{n-1}X^{n-1}+s_{n-2}X^{n-2}+\dots s_1X+s_0$$

Assuming that n random numbers $e_i$ are random numbers in the Gaussian distribution (the normal distribution) in which an average value is a plaintext $\mu_i$ and a variance is α, the following polynomial e(X) is structured from these random numbers.

$$e(X)=e_{n-1}X^{n-1}+e_{n-2}X^{n-2}+\dots e_1X+e_0$$

Decomposition of s(X)·a(X)+e(X) is performed into $f(X)(X^n+1)+b(X)$, and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) determined in such a manner that cps becomes an element of $T[X]/(X^n+1)$ serves as a decryption function, where $\varphi_s((a(X), b(X))=b(X)-s(X)\cdot a(X)+g(X)(X^n+1)$, as in TLWE encryption. In other words, $(b(X)-s(X)\cdot a(X))\bmod(X^n+1)$ serves as a decryption function, where mod is a remainder of division.

[Gadget Decomposition]

Gadget Decomposition is described.

A coefficient in a polynomial used in a TRLWE ciphertext is a real number that is an element of the circle group {T} in FIG. 3 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial F(X) of a TRLWE ciphertext is 2, one unit of decomposition is $Bg=2^2$, and decomposition into l=3 elements is performed. At this time, each element is arranged to enter between −Bg/2 and Bg/2.

A TRLWE ciphertext is a combination of two polynomials like (a(X), b(X)) as described above. Therefore, a TRLWE ciphertext d can be written as $$d=[0.75X^2+0.125X+0.5,0.25X^2+0.5X+0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since 0.75=−0.25 is established on the circle group {T}, decomposition can be performed as follows.

$$\begin{aligned} d &= [0.75X^2+0.125X+0.5,\ 0.25X^2+0.5X+0.375] \\ &= [-0.25X^2+0.125X+0.5,\ 0.25X^2+0.5X+0.25+0.125] \\ &= [0.25\times(-X^2+2)+0.25^2\times 2X+0.25^3\times 0,\ 0.25\times(X^2+2X+1)+ \\ &\qquad 0.25X^2\times 2+0.25^3\times 0] \end{aligned}$$

Therefore, when Gadget Decomposition is performed, a vector $$\mathrm{Dec}(d)=[-X^2+2,2X,0,X^2+2X+1,2,\ 0]$$

is obtained.

An operator H of inverse transform from a vector to a ciphertext is also defined.

When the description is provided based on the example described above, a matrix $$H=\begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of the inverse transform. A TRLWE ciphertext d is obtained by performing an operation Dec(d)·H. The lower bits are rounded off.

It can also be said that an operation of obtaining [v] that makes ‖d−[v]·H‖ minimum with respect to the TRLWE ciphertext d is Gadget Decomposition. Here, ‖ is a vector norm (length).

Ciphertexts Zi=(a(X), b(X)) formed by polynomials in which all coefficients of e(X) have an average value of 0 and a variance is α are created. The number of the created ciphertexts is 2l.

The plaintext μ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is obtained by encrypting a private key by TRGSW encryption in order to use the private key in Gate Bootstrapping.

Separately from the private key [s] (Nth order) used for TLWE ciphertexts, each element of a private key [s'] for encrypting the private key [s] is selected to be either of two values, i.e., 0 or 1 for use in Gate Bootstrapping.

It is necessary to make the order of the private key [s] the same as the order n of polynomials used in TRLWE encryption.

The TRGSW ciphertext BK is created for each element of the private key [s].

When decryption with the private key [s'] is performed, 2l TRLWE ciphertexts Zj are created where $\varphi_{s'}(Zj)=0$ is satisfied.

BKi is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts are prepared, where N is the same as the order of the private key [s]. A set of the N TRGSW ciphertexts thus prepared is referred to as "Bootstrapping Key".

The cross product of the TRGSW ciphertext BKi and the TRLWE ciphertext d is defined as follows.

$$BKi \times d = Dec(d) \cdot BKi$$

Gadget Decomposition is an operation of obtaining [v] that makes ||d−[v]·H|| minimum with respect to the TRLWE ciphertext d.

Therefore, by using [v]=Dec(d) and an error $(\varepsilon_a(X), \varepsilon_b(X))$, $[v] \cdot H = d + (\varepsilon_a(X), \varepsilon_b(X))$ can be written.

As a result, $$BKi \times d = Dec(d) \cdot BKi = \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates the dot product, and $[v] \cdot H = d + (\varepsilon_a(X), \varepsilon_b(X))$ is substituted into the right side, $$= \sum_{j=1}^{2\ell} v_j \times Z_j + s_i \times (d + (\epsilon_a(X), \epsilon_b(X)))$$
$$= \sum_{j=1}^{2\ell} v_j \times Z_j + s_i \times d + s_i \times (\epsilon_a(X), \epsilon_b(X))$$

is obtained, and becomes the same as calculation of the sum of the following three ciphertexts c1, c2, and c3.

$$c_1 = \sum_{j=1}^{2\ell} v_j \times Z_j$$
$$c_2 = s_i \times d$$
$$c_3 = s_i \times (\epsilon_a(X), \epsilon_b(X))$$

Since TRLWE encryption is additive homomorphic encryption, calculating the sum of ciphertexts is the same as calculating the sum of plaintexts.

Since $c_1$ is obtained by adding several times of $Z_j$, an expected value of the plaintext $\varphi_{s'}(c_1)$ is 0.

In addition, $\varphi_{s'}(c_3)$ obtained by decryption is set to be sufficiently small also in the subsequent operations, because the magnitude of an absolute value of a plaintext can be limited by a system parameter.

In this case, $\varphi_{s'}(BKi \times d) = \varphi_{s'}(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1 - d_0$ is substituted for d, and $d_0$ is finally added, the following CMux function is completed.

$$\mathrm{CMux}(BK_i, d_0, d_1) = BKi \times (d_1 - d_0 = \mathrm{Dec}(d_1 - d_0) \cdot BK_i + d_0$$

The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate a ciphertext corresponding to the plaintext $\mu_0$ or the plaintext $\mu_1$, the calculation result does not show which one is selected, without decryption of the ciphertext.

Binary Gate Bootstrapping in TFHE is performed using various information described above.

Binary Gate Bootstrapping is configured by three steps described below, i.e., (1) BlindRotate, (2) SampleExtract, and (3) Public Key Switching.

Figure 4:
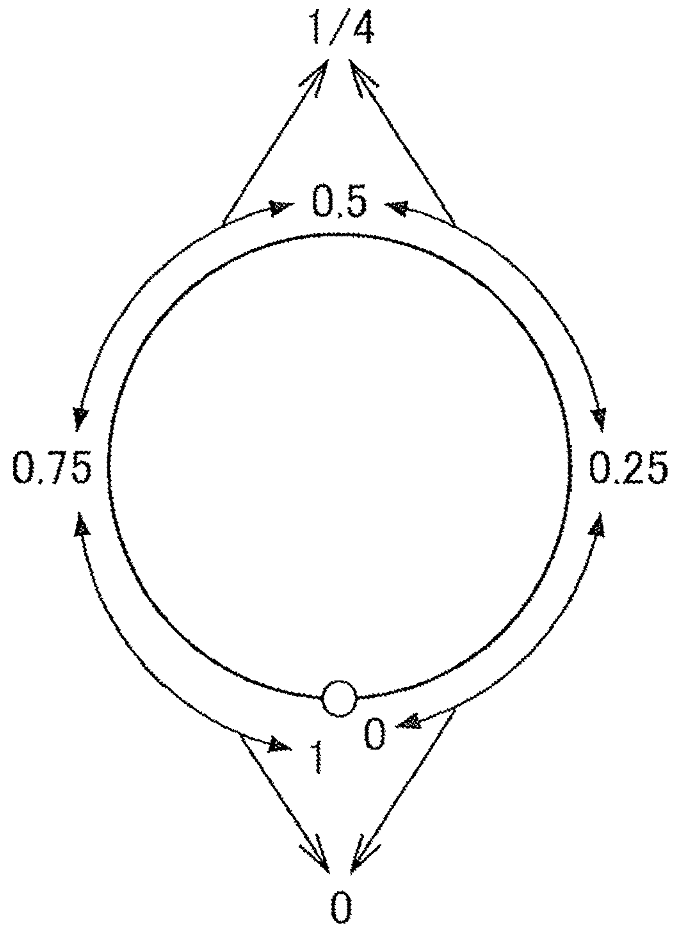
FIG. 4 is an operation image diagram of binary Gate Bootstrapping.

FIG. 4 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (¼) or 0.75 (¾) to 1 on the circle group {T} in FIG. 3 is converted to a TLWE ciphertext 0, and a plaintext in a section from 0.25 (¼) to 0.75 (¾) is converted to a ciphertext 0.25 (¼).

An error added to the plaintext in this conversion is any error in a range of ±1/16.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, φs(c') is a plaintext obtained by applying a decryption function to the following LWE ciphertext c'.

In BlindRotate, the following polynomial T(X)

$$T(X)=F(X)\cdot X^{n/2}$$

is prepared, which is obtained by multiplying the following polynomial F(X)

$$F(X)=\mu X^{n-1}+\mu X^{n-2}+\ldots \mu X+\mu$$

where $\mu=1/8$, that forms the above-described finite cyclic group and serves as a test vector, by $X^{n/2}$.

It is assumed that there is a TLWE ciphertext c obtained by encrypting the plaintext μ1 with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1'=\varphi_s(c')\approx 2n\times\varphi_s(c)=2n\mu 1$ is obtained. While both sides are not always coincident with each other because of a rounding error, the error becomes smaller relatively as n becomes larger.

A trivial TRLWE ciphertext (0, T(X)) whose plaintext is the polynomial T(X) is prepared, and it is assumed that $A_0=X^{-b'}\times(0, T(X))=(0, X^{-b'}\times T(X))$, where 0 indicates a 0th order polynomial 0. Since b' is an integer, exponentiation can be defined naturally. Actually, it suffices to cause a coefficient of each term of a polynomial of the TRLWE ciphertext to cycle by a predetermined number.

Subsequently, $A_i=\mathrm{CMux}(BK_i, A_{i-1}, X^{a'i}A_{i-1})$ is calculated in turn by using $BK_i$ that is the Bootstrapping Key described above. Since a'i is an integer also in this expression, a power of X can be defined naturally. Similarly, it suffices to cause a coefficient of each term of a polynomial that is an element of a TRLWE ciphertext $A_{i-1}$ to cycle by a predetermined number, instead of calculating the power of X.

Accordingly, the plaintext is not changed when $s_i$ is 0, and multiplication by $X^{a'i}$ is performed in turn when $s_i$ is 1.

Therefore when calculation is repeated as represented by $$\begin{aligned}\phi_{s'}(A_0) &= X^{-b'}T(X)\\ \phi_{s'}(A_1) &= X^{s_1a'_1-b'}T(X)\\ \phi_{s'}(A_2) &= X^{s_2a'_2+s_1a'_1-b'}T(X)\end{aligned},$$

then $$\phi_{s'}(A_n) = X^{\sum_{i=1}^{N}s_i\times a'_i-b'}T(X)$$

is obtained.

Here, $$\sum_{i=1}^{N}s_i\times a'_i-b'$$

is equal to the decryption function φs(c) with the sign reversed. Therefore, $$\phi_{s'}(A_n)=X^{-\phi_s(c')}T(X)$$

is obtained. Here, $\varphi_{s'}(A_n)$ is a polynomial obtained by multiplying the polynomial T(X) by $X^{-1}$ μ1' times and $A_n$ is its ciphertext.

It should be noted that at this time, the error component of the plaintext e with error of the first set TLWE ciphertext c appears as the amount of rotation of the polynomial T(X) but does not appear as the magnitude of the coefficient value of each term. In TFHE, the error is essentially reduced by this mechanism.

Furthermore, in association with the plaintext μ1 of the TLWE ciphertext c related to BlindRotate, unique values (up to 2n values including n coefficients and n values obtained by reversing the signs of the n coefficients) in accordance with the number of times μ1'(=2nμ1) of multiplication of the polynomial T(X) by $X^{-1}$ are obtained as coefficients of constant terms of a plaintext polynomial. These values can also be regarded as a kind of lookup table.

(2) SampleExtract

In the plaintext polynomial $\varphi_{s'}(A_n)$ obtained by decrypting the TRLWE ciphertext $A_n$ obtained by BlindRotate in (1), n/2−$\varphi_x$(c') terms from the lowest term have a coefficient of −μ. When $\varphi_{s'}(A_n)$ is negative, coefficients are −μ from the highest term in turn conversely.

When attention is paid only to a constant term of the plaintext polynomial $\varphi_{s'}(A_n)$ obtained by decrypting the TRLWE ciphertext $A_n$, the constant term is μ if $\varphi_s$(c') is equal to or greater than n/2 and less than 3n/2, that is, $\varphi_s$(c) is ½±¼. Otherwise, i.e., if $\varphi_s$(c) is ±¼, the constant term is −μ. SampleExtract is a process for extracting only the coefficient of the constant term of the plaintext polynomial $\varphi_{s'}(A_n)$ from the TRLWE ciphertext $A_n$ obtained by BlindRotate in (1) without decrypting the TRLWE ciphertext $A_n$, thereby obtaining a TLWE ciphertext cs.

As described above, the error added to the TLWE ciphertext c as the first input and the rounding error only affect the position of the boundary at which the plaintext and the plaintext of the constant term is switched between μ and −μ. The influence on the magnitude of the coefficient of the constant term is negligibly small. That is, it can be interpreted that an input error is removed. Further, the width within which the boundary at which the value of the plaintext of the constant term is switched can be shifted without causing any problem is the error limit within which a Bootstrapping process can be performed correctly, and serves as a mechanism of causing a trade-off described later.

The process for obtaining the TLWE ciphertext cs is described.

All TRLWE ciphertexts can be expressed as (A(X), B(X)) by putting polynomials as $$A(X)=\sum_{i=1}^{n}a_iX^{i-1}$$
$$B(X)=\sum_{i=1}^{n}b_iX^{i-1}$$

where n is the order.

When decryption with the private key [s'] is performed, the expression can be expanded by putting a polynomial of the private key as $$S'(X)=\sum_{j=1}^{n}s'_jX^{j-1}.$$

Then, $$\phi_{s'}(c)=B(X)-S'(X)\cdot A(X)=\sum_{i=1}^{n}b_iX^{i-1}-\sum_{i=1}^{n}\sum_{j=1}^{n}a_is'_jX^{(i+j-2)}$$

is obtained.

The following operation is then performed with regard to this expression.

$$\begin{aligned}
&\sum_{i=1}^{n}b_iX^{i-1}-\sum_{i=1}^{n}\sum_{j=1}^{n}a_is'_jX^{(i+j-2)}=\\
&\sum_{i=1}^{n}b_iX^{i-1}-\sum_{i=1}^{n}\sum_{j=i-1}^{n+i-2}a_is'_{j-i+2}X^j=\\
&\sum_{i=1}^{n}b_iX^{i-1}-\sum_{i=1}^{n}\sum_{j=i-1}^{n-1}a_is'_{j-i+2}X^j-\sum_{i=1}^{n}\sum_{j=n}^{n+i-2}a_is'_{j-i+2}X^j=\\
&\sum_{j=1}^{n}b_jX^{j-1}-\sum_{j=0}^{n-1}\sum_{i=1}^{j+1}a_is'_{j-i+2}X^j-\sum_{j=n}^{2n-2}\sum_{i=j-n+2}^{n}a_is'_{j-i+2}X^j=\\
&\sum_{j=0}^{n-1}b_{j+1}X^j-\sum_{j=0}^{n-1}\sum_{i=0}^{j}a_{i+1}s'_{j-i+1}X^j-\sum_{j=0}^{n-2}\sum_{i=j-n+1}^{-1}a_{i+n+1}\\
&s'_{j-i+1}X^{j+n}=\sum_{j=0}^{n-2}b_{j+1}X^j+b_nX^{n-1}-\sum_{j=0}^{n-2}\sum_{i=0}^{j}a_{i+1}s'_{j-i+1}X^j-\\
&\sum_{i=0}^{n-1}a_{i+1}s'_{n-i}X^{n-1}-\sum_{j=0}^{n-2}\sum_{i=j-n+1}^{-1}a_{i+n+1}s'_{j-i+1}X^{j+n}=\\
&\sum_{j=0}^{n-2}\left(b_{j+1}X^j-\sum_{i=0}^{j}a_{i+1}s'_{j-i+1}X^j-\sum_{i=j-n+1}^{-1}a_{i+n+1}s'_{j-i+1}X^{j+n}\right)+\\
&b_NX^{n-1}-\sum_{i=0}^{n-1}a_{i+1}s'_{n-i}X^{n-1}
\end{aligned}$$

Since this is "a factor ring of a polynomial ring", the remainder when this is divided by ($X^n$+1) is calculated. Then, $$\begin{aligned}
&\sum_{j=0}^{n-2}\left(b_{j+1}X^j-\sum_{i=0}^{j}a_{i+1}s'_{j-i+1}X^j+\sum_{i=j-n+1}^{-1}a_{i+n+1}s'_{j-i+1}X^j\right)+\\
&b_NX^{n-1}-\sum_{i=0}^{n-1}a_{i+1}s'_{n-1}X^{n-1}=\\
&\sum_{j=0}^{n-2}\left(b_{j+1}-\sum_{i=0}^{j}a_{i+1}s'_{j-i+1}+\sum_{i=j-n+1}^{-1}a_{i+n+1}s'_{j-i+1}\right)X^j+\\
&\left(b_n-\sum_{i=0}^{n-1}a_{i+1}s'_{n-1}\right)X^{n-1}
\end{aligned}$$

is obtained.

Further, when $$a'_i=\begin{cases}a_i & (i\geq 1)\\ -a_{i+n} & (\text{otherwise})\end{cases}$$

is put, then $$\begin{aligned}
&=\sum_{j=0}^{n-2}\left(b_{j+1}-\sum_{i=0}^{j}a'_{i+1}s'_{j-i+1}-\sum_{i=j-n+1}^{-1}a'_{i+1}s'_{j-i+1}\right)X^j+\\
&\left(b_N-\sum_{i=0}^{n-1}a'_{i+1}s'_{n-i}\right)X^{n-1}\\
&=\sum_{j=0}^{n-2}\left(b_{j+1}-\sum_{i=j-n+1}^{j}a'_{i+1}s'_{j-i+1}\right)X^j+\left(b_N-\sum_{i=0}^{n-1}a_{i+1}s'_{n-i}\right)X^{n-1}\\
&=\sum_{j=0}^{n-2}\left(b_{j+1}-\sum_{i=0}^{n-1}a'_{i+j-n+2}s'_{n-i}\right)X^j+\left(b_n-\sum_{i=0}^{n-1}a_{i+1}s'_{n-i}\right)X^{n-1}\\
&=\sum_{j=0}^{n-2}\left(b_{j+1}-\sum_{i=0}^{n-1}a'_{i+j-n+2}s'_{n-i}\right)X^j
\end{aligned}$$

is obtained, and coefficients of respective terms of a plaintext polynomial are obtained from $$\phi_{s'}(c)=\sum_{j=0}^{n-1}\left(b_{j+1}-\sum_{i=0}^{n-1}a'_{i+j-n+2}s'_{n-i}\right)X^j.$$

Among the obtained coefficients, a coefficient of a constant term is necessary. Therefore, when a coefficient for j=0 is extracted, $$b_1-\sum_{i=0}^{n-1}a'_{i-n+2}s'_{n-i}$$

is obtained. When $$a''_i=a'_{-i+2}$$

is put, the extracted coefficient can be deformed into a decryption function of TLWE encryption as represented by $$b_1-\sum_{i=0}^{n-1}a''_{n-i}s'_{n-i}=b_1-\sum_{i=0}^{n-1}a''_is'_i=b_1-\vec{s'}\cdot\vec{a''}=\phi_{s'}\left(\vec{a''},b_1\right).$$

That is, when coefficients are extracted from the TRLWE ciphertext $A_n$=(A(X), B(X)) obtained by BlindRotate in (1) while the coefficients are set as $$a''_i=\begin{cases}a_1 & (i=1)\\ -a_{-i+n+2} & (\text{otherwise})\end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext is the output of SampleExtract and has either of two types of plaintexts, i.e., −μ or μ.

A trivial ciphertext ([0], μ) of which the plaintext is μ is added to the thus obtained TLWE ciphertext, thereby obtaining a TLWE ciphertext cs=([a"], b1)+([0], μ).

Specifically, since μ=⅛ in the polynomial F(X) as a test vector, a ciphertext of −⅛ or ⅛ is obtained in this stage.

When the trivial TLWE ciphertext ([0], ⅛) of which the plaintext is μ=⅛ is added to this ciphertext,

−⅛+⅛=0

⅛+⅛=¼ are established, and thus a new TLWE ciphertext cs having either of two values, i.e., 0 or ¼ as the plaintext is obtained.

(3) Public Key Switching

The TLWE ciphertext cs obtained in SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of Public Key Switching is described.

The private key [s] for a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3}$$

The private key is [s]. The "number of digits" t is a system parameter.

When decryption is performed with the private key [s], $$\phi_s(KS_{i,j}) = s'_i \times 2^{-j}$$

is obtained. This is a "key switching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers by one each, the t-bit fixed point numbers can be written in the following form.

$$a_i \approx \sum_{j=1}^{t} a_{i,j} \times 2^{-j}.$$

Although an error is increased in this stage, the maximum value of the absolute value can be limited by a system parameter.

As main processing of Public Key Switching, the following TLWE ciphertext cx is calculated.

$$cx = (\vec{0}, b) - \sum_{i=1}^{n} \sum_{j=1}^{t} a_{i,j} \times KS_{i,j}$$

Since the term ([0], b) is a trivial ciphertext, this term is b when being decrypted. A result of decryption of the TLWE ciphertext cx is as follows.

$$\phi_s(cx) = b - \sum_{i=1}^{n} \sum_{j=1}^{t} a_{i,j} \times s'_i \times 2^{-j} = b - \sum_{i=1}^{n} \sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j}$$

The expression obtained in decomposition into the fixed-point numbers is then substituted.

$$\approx b - \sum_{i=1}^{n} s'_i \times a_i = \phi_{s'}((\vec{a}, b)) = \phi_{s'}(c_s)$$

As a result, $$\phi_s(cx) \approx \phi_{s'}(c_s)$$

is obtained, and key switching is successful.

The TLWE ciphertext cx obtained here is encrypted with the private key [s] that is the same as the private key for the TLWE ciphertext c used as the input of Gate Bootstrapping.

By performing the processing of Public Key Switching, the ciphertext returns to the TLWE ciphertext encrypted with the private key [s], so that its plaintext $\varphi_s(cx)$ is 0 when $\varphi_s(c)$ is in a range of ±¼, and is ¼ when $\varphi_s(c)$ is in a range of ½±¼.

With the processing described above, a TLWE ciphertext is obtained as a result of Gate Bootstrapping, which is either of two values, i.e., 0 or ¼ and has any error within ±1/16.

The maximum value of the error does not depend on the TLWE ciphertext c that is the input, and is a value fixed by a system parameter.

Therefore, the system parameter is set in such a manner that the maximum value of the error is any value within ±1/16 that is the same range as that for a TLWE ciphertext as the input.

This setting enables a NAND operation to be performed any number of times, and enables any operation including addition and multiplication to be performed.

Examples of an error added to the "plaintext" of a TLWE ciphertext output from Gate Bootstrapping include an error added by converting a TLWE ciphertext into an integer, an error added by CMux, and an error when the TLWE ciphertext is converted to a fixed-point number in Public Key Switching. All these errors can be limited by a system parameter, and the system parameter can be adjusted in such a manner that an error for which all things are considered falls within ±1/16.

The processing described above is processing of Gate Bootstrapping in TFHE.

As described above, TFHE is Bit-wise type homomorphic encryption that has zero or non-zero as the plaintext and enables a logical operation to be performed. However, the plaintext is a real number from 0 to 1 associated with the circle group {T}, as described with reference to FIG. 3. Therefore, by associating sections obtained by dividing the circle group {T} with integers in turn, TFHE can be applied as Integer-wise type homomorphic encryption having an integer as the plaintext.

Figure 5:
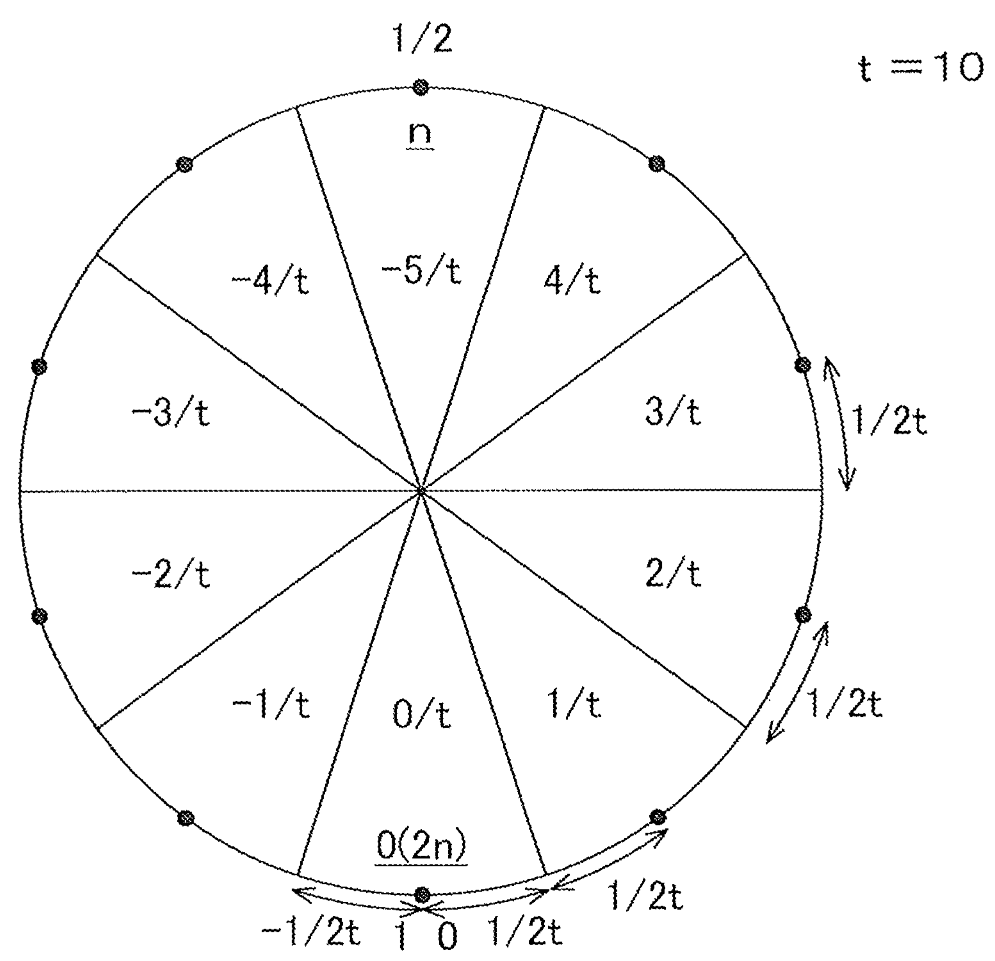
FIG. 5 is an explanatory diagram of TFHE applied to an Integer-wise type.

FIG. 5 is an explanatory diagram of TFHE applied to the Integer-wise type.

As illustrated in FIG. 5, the range from 0 to 1 associated with the circle group {T} is divided into t. For a TLWE ciphertext, possible values of a plaintext are t values obtained by dividing the range from 0 to 1, i.e., from −(t/2) to (t/2)−1, and (t/2)−1 is the maximum value of the integer that can be stored in one TLWE ciphertext.

As exemplified in FIG. 5, assuming that t is set to 10 and the range from 0 to 1 is divided into 10, a ciphertext can represent integers of −5, −4, −3, −2, −1, 0, 1, 2, 3, and 4. These integer values are assigned to sections centered on −5/t, −4/t, −3/t, −2/t, −1/t, 0/t, 1/t, 2/t, 3/t, and 4/t that are obtained by dividing the range of 0 to 1 of the circle group {T} into t=10, respectively. By this assignment, integers can be successively assigned counterclockwise from the region that is centered on ½ and is the minimum value when being represented by integer, as illustrated in FIG. 5.

As illustrated in FIG. 5, 0 (1) on the circle group {T} is within the range of the region from −1/(2t) to 1/(2t).

As for a plaintext of a ciphertext on the circle group {T}, the position in the region (the position on the circle group {T}) can be adjusted by adding or subtracting an offset based on, for example, 1/(2t) to/from the state in FIG. 5, as necessary.

In the embodiment described below, the meaning of the division number t of the circle group is different from that in the description related to FIG. 5, although it is essentially unchanged.

Calculation of an odd function and an even function is described below.

FIGS. 6A to 8 are explanatory diagrams of Integer-wise type TFHE in the present embodiment.

Figure 6A:
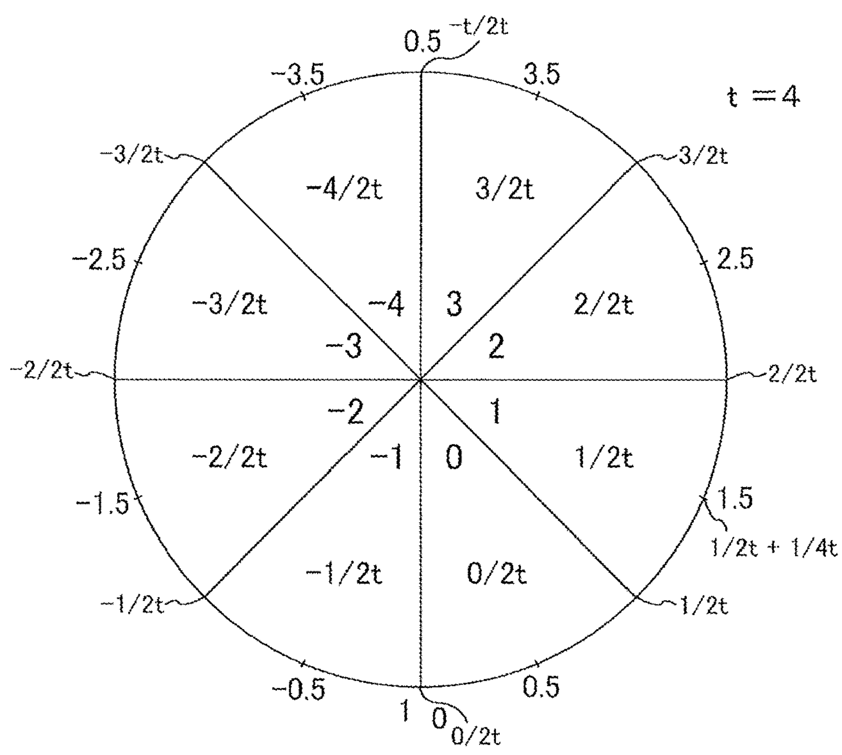
FIGS. 6A and 6B are explanatory diagrams of Integer-wise type TFHE in the present embodiment.
Figure 6B:
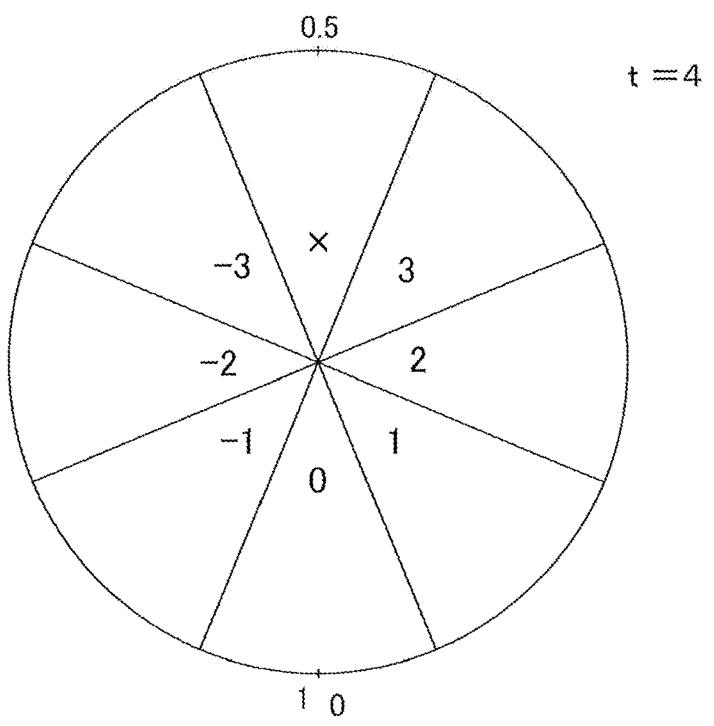

A state where no offset is added to a plaintext (the offset for the plaintext is 0) is illustrated in FIG. 6B, similarly to FIG. 5.

FIG. 6A illustrates a state where an offset of, for example, +1/(4t) is added to the plaintext of a ciphertext illustrated in FIG. 6B. By adding the offset, the manner of slicing the circle group {T} can be changed.

In the following description, it is assumed that the right half plane and the left half plane of a circle group are based on the state in FIG. 6A where the offset of 1/(4t) is added.

It is assumed that there is a TLWE ciphertext ca used as an argument of a function f to be calculated.

The TLWE ciphertext ca is a TLWE ciphertext having the configuration illustrated in FIG. 6A and divides each of the right half plane and the left half plane into t to divide the entire circle group {T} into 2t.

In the following description, the range from 0 to 1 of the circle group {T} may be described as −0.5 to 0.5 (−½ to ½).

As illustrated in FIG. 6A, the TLWE ciphertext ca has a real number a/(2t)+1/(4t) corresponding to an integer a that cannot be known without a private key, as the plaintext.

a/(2t)+1/(4t) is a plaintext without error, and a value with an error added thereto is stored as the plaintext actually. Here, the encryption processing device 1 sets system parameters so as to make a range of the error added to the plaintext less than ±1/{4(t+1)}.

In the present embodiment, as for the TLWE ciphertext ca, the right half plane of the circle group {T} is associated with a plaintext that is a non-negative integer, and the left half plane is associated with a plaintext that is a negative integer.

The fact that the plaintext of the TLWE ciphertext ca is a/(2t) is based on the fact that the entire circle group is divided into 2t.

In FIG. 6A, the left half plane of the circle group {T}, which handles negative numbers, represents integers from −t to −1 by using slices from the slice starting from −t/(2t) to the slice starting from −1/(2t) counterclockwise from top.

The right half plane of the circle group {T}, which handles 0 and positive numbers (non-negative numbers), represents integers from 0 to t−1 by using slices from the slice starting from 0/(2t) to the slice starting from (t−1)/(2t) in the counterclockwise direction from bottom.

In the TLWE ciphertext ca, integer values are assigned to respective sections having a width of 1/(2t) obtained by dividing the circle group {T}.

A value of a plaintext integer a TLWE ciphertext can take is 2t values obtained by dividing the value region 0 to 1, from −t to t−1, in which t−1 is the maximum integer that can be recorded in one TLWE ciphertext and −t is the minimum integer that can be recorded in one TLWE ciphertext.

As for the TLWE ciphertext ca, an offset of 1/(4t) is added to the plaintext as described above, so that plaintexts corresponding to an integer 0, for example, are distributed around 0+1/(4t) of the circle group {T} with an error added thereto. Accordingly, the position of 0 on the circle group {T} can be set to the boundary between the integer 0 and the integer −1. The section for 0 is assumed as a range on the circle group {T} from 0 to 1/(2t), and the circle group {T} is divided into slices in such a manner that blocks are adjacent to the block from 0 to 1/(2t) in turn.

In the state where no offset is added illustrated in FIG. 6B, 0 (1) on the circle group {T} is within the slice from −1/(4t) to 1/(4t) (one slice corresponds to a noise added to a plaintext around 0). In this case, a region close to 0.5 cannot be used, and therefore the entire plane of the circle group cannot be used.

As illustrated in FIG. 6A, by adding the offset, the integer 0 can be associated with the slice (0/(2t)) starting from 0 on the circle group {T}. At the same time, the plaintext can be placed at the center of the slice. Another slice starts from X/(2t) (where X is a plaintext integer).

In FIG. 6A, the plaintext with the offset added thereto is located at the center of each slice (for example, the slice starting from 1/(2t)) with an error range of ±1/(4t). At this time, the average of the normal distribution is, for example, 1/(2t)+1/(4t), and plaintexts are distributed within the error range of ±1/(4t) in most cases. The plaintexts are thus distributed at the center of the slice starting from 1/(2t).

Although the plaintext with the offset added thereto is illustrated only in the slice of 1/(2t) in FIG. 6A, this illustration is merely an example. A plaintext with an offset added to a value serving as a starting point is present in every slice. The same applies to FIG. 7 described later.

As described above, the ciphertext in FIG. 6A divides the right half plane of the circle group {T} into t and the left half plane into t. The right half plane of the circle group {T} corresponds to 0 and positive plaintext integers (0 to t−1), and the left half plane corresponds to negative plaintext integers (−1 to −t). The width of one block (slice) is 1/(2t).

Integer values are respectively assigned to the slices obtained by dividing the range from 0 to 1 (−½ to ½) of the circle group {T} into 2t and respectively starting from −t/(2t) to (t−1)/(2t).

Non-negative integers are assigned to slices starting from 0/(2t), 1/(2t), . . . , (t−3)/(2t), (t−2)/(2t), and (t−1)/(2t) of the right half plane, respectively. Negative integers are assigned to slices starting from −t/(2t), −(t−1)/(2t), −(t−2)/(2t), . . . , −1/(2t) of the left half plane, respectively.

These slices are each centered at a value obtained by adding the offset of +1/(4t) to the value serving as the starting point. The offset of 1/(4t) corresponds to half of the slice width of 1/(2t). When the offset of 1/(4t) is included in integer representation, it can be represented as an offset of +0.5 for convenience.

As illustrated in FIG. 6A, when 2t=8 (t=4) and the range of the circle group is divided into eight, integers from 0 to 3 (=t−1) can be represented by the right half plane of the circle group {T}, and integers from −4 (=−t) to −1 can be represented by the left half plane. That is, the entire ciphertext can represent the integers −4, −3, −2, −1, 0, 1, 2, and 3.

These integer values are assigned to sections obtained by dividing the range of the circle group {T} into 2t=8 and starting from −4/(2t), −3/(2t), −2/(2t), −1/(2t), 0/(2t), 1/(2t), 2/(2t), and 3/(2t), respectively. Integers are successively assigned counterclockwise from the region starting from ½.

Considering the above-described offset of 0.5, the slice starting from 1/(2t) on the right half plane, for example, is the slice centered on 1.5/(2t), and the slice starting from −4/(2t) on the left half plane, for example, is the slice centered on −3.5/(2t). Integers represented to include the offset are −3.5, −2.5, −1.5, −0.5, 0.5, 1.5, 2.5, and 3.5 counterclockwise from top.

The range of integer values that can be recorded in a TLWE ciphertext can be made larger by making the value oft larger and dividing the circle group {T} more finely. However, when the circle group is divided too finely, there is a problem that the range of the error to be added to the plaintext becomes too small, thus lowering the strength of encryption. This point will be described later.

The value of the offset, 1/(4t), is merely an example, and is not limited thereto. In accordance with the offset value, it is necessary to adjust a polynomial and parameters.

Methods are described that calculate an odd function and an even function by using the circle group in FIG. 6A.

Method 1 and its application and Method 2 that calculate an odd function and Methods 3 and 4 that calculate an even function are described below.

[Odd Function]

When a function f(x) for a real number x satisfies f(31 x)=−f(x), the function is defined as an odd function.

The encryption processing device 1 sets an odd function to be calculated to f(x) and obtains a new ciphertext having a plaintext of f(a+0.5) from the value a of the plaintext integer of the TLWE ciphertext ca.

<Method 1>

This method corresponds to (a-1) in FIG. 2A.

Figure 7:
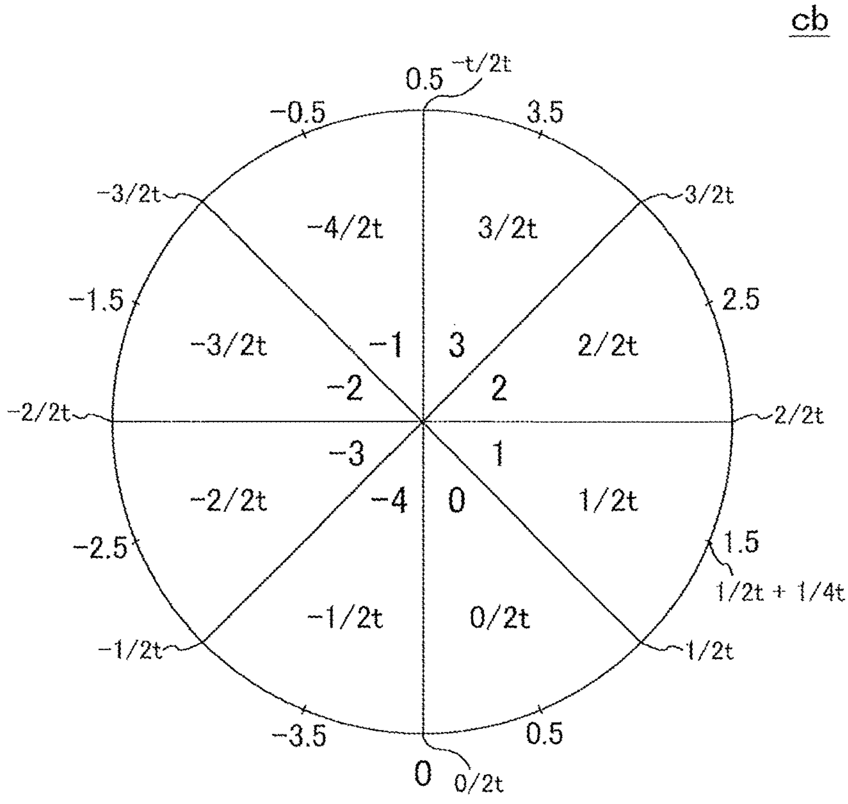
FIG. 7 is an explanatory diagram of Integer-wise type TFHE in the present embodiment.

The encryption processing device 1 performs the first Bootstrapping for the TLWE ciphertext ca by using a step function $$F_{id}(X)=\sum_{k=0}^{t-1}\left(\frac{k}{2t}+\frac{1}{4t}\right)\sum_{l=0}^{\frac{n}{t}-1}X^{\frac{n}{t}k+l}$$

that is a function of a univariate polynomial (univariate function) to obtain the TLWE ciphertext cb illustrated in FIG. 7 in which values on the left half plane of the circle group {T} handling negative numbers (corresponding integer values) are inverted.

Gate Bootstrapping includes BlindRotate, SampleExtract, and Public Key Switching.

For an operation of a univariate function for an encrypted integer value, a method can be used which is obtained by expanding Gate Bootstrapping in Chillotti et al., 2020. This method is described in "Bootstrapping in FHEW-like Cryptosystems, Daniele Micciancio and Yuriy Polyakov, Duality technologies, Feb. 23, 2020". The disclosed method does not set coefficients of a test vector to a constant μ, but sets the result of the function, thereby obtaining a different result depending on the value of the TLWE ciphertext.

FIG. 7 illustrates a circle group corresponding to the TLWE ciphertext cb. As illustrated in FIG. 7, in the ciphertext cb, the order of values on the left half plane that is a region used as negative values are inverted from that in the TLWE ciphertext ca as a result of the first Bootstrapping using the univariate function $F_{id}$.

For input of a ciphertext of a non-negative integer from 0 to t−1, the univariate function $F_{id}$ outputs the same ciphertext of a non-negative integer from 0 to t−1 and adds an offset of 0.5 to the plaintext. For input of a ciphertext of a negative integer from −t to −1, the univariate function $F_{id}$ outputs a ciphertext of an integer from −1 to −t and adds an offset of 0.5 to the plaintext integer.

As illustrated in FIG. 6A, the width of a slice to which one integer corresponds in the TLWE ciphertext ca is 1/(2t). Thus, adding the offset of 0.5 to the plaintext integer a in the TLWE ciphertext cb is equivalent to adding an offset of 1/(4t) to the plaintext real number a/(2t), for example. Integer representation that includes the offset of +1/(4t) added to the plaintext is represented as +0.5.

In a case where a plaintext is located on the right half plane of the circle group {T} in FIG. 6A (the plaintext is a non-negative number), the plaintext integer of the TLWE ciphertext cb remains within the same slice (region) of the circle group {T} as illustrated in FIG. 7 as a result of the above-described process using the univariate function $F_{id}$. Meanwhile, in a case where a plaintext is a negative number from −t to −1 and located on the left half plane of the circle group {T}, the order of the plaintext integers of the TLWE ciphertext cb is inverted on the circle group {T} as illustrated in FIG. 7 as a result of the above-described process.

For example, in a case where the plaintext integer a in the TLWE ciphertext ca is −1 as illustrated in FIG. 6A, this value as a value on the circle group {T} is located in the section from −1/(2t) to 0. Therefore, the term of the leading block in the polynomial F id appears as the last term with the sign reversed. The plaintext of the TLWE ciphertext cb after the first Bootstrapping thus becomes −½+1/(4t) as a value on the circle group and −t as an integer.

In a case where the plaintext integer a in the TLWE ciphertext ca is −t, this value as a value on the circle group {T} is −t/(2t)+1/(4t)=−½+1/(4t) and located in the closest block to −½ on the left half plane. Since the result of sign reversal of the term of the last block in the univariate function $F_{id}$ is obtained as the TLWE ciphertext cb after the first Bootstrapping, the plaintext of the TLWE ciphertext cb becomes −1/(4t) as a value on the circle group, that is, −1 as an integer.

On the right half plane in FIG. 7, integers from 0 to t−1 are assigned to slices from 0/(2t) to 3/(2t) counterclockwise from bottom, and the order of plaintext integers is not changed from that in FIG. 6A.

Meanwhile, on the left half plane, integers from −1 to −t are assigned to slices from −t/(2t) to −1/(2t) counterclockwise from top, so that the order is inverted from that in FIG. 6A.

In the ciphertext cb illustrated in FIG. 7, integers are −1, −2, −3, −4, 0, 1, 2, and 3 from top on the circle group {T}. Positive values and negative values are arranged continuously on the circle group {T}.

In FIG. 6A, in a case where the TLWE ciphertext ca is a ciphertext of −1, for example, the plaintext is located in the section from −1/(2t) to 0 on the circle group {T}.

As a result of the above process, in the TLWE ciphertext cb, the term of the leading block in the univariate function $F_{id}$ appears as the last term with the sign reversed. Therefore, in FIG. 7, the plaintext of the TLWE ciphertext ca is −½+1/(4t) as a value on the circle group {T}. Although this plaintext corresponds to the integer −t(=−4) in FIG. 6A, −1 is assigned as the plaintext integer in the ciphertext cb illustrated in FIG. 7.

In FIG. 6A, in a case where the TLWE ciphertext ca is a ciphertext of −t, for example, the plaintexts are distributed around −t/(2t)+1/(4t) on the circle group {T} (is slightly larger than −½). The plaintexts are thus located in the closest section to −½ on the circle group {T}.

As a result of the above process, in the TLWE ciphertext cb, the term of the last block in the univariate function $F_{id}$ appears with the sign reversed. Therefore, in FIG. 7, the plaintext of the TLWE ciphertext ca is −1/(2t)+1/(4t) as a value on the circle group {T}. Although this plaintext corresponds to the integer −1 in FIG. 6A, −t(=−4) is assigned as plaintext integer in the ciphertext cb illustrated in FIG. 7.

When the above description is generalized, the plaintext of the TLWE ciphertext ca, which is a non-negative number, becomes a/(2t)+1/(4t) in the TLWE ciphertext cb, and remains a as a plaintext integer.

Meanwhile, the plaintext of the TLWE ciphertext ca, which is a negative number, becomes −(t+1+a)/(2t)+1/(4t) in the TLWE ciphertext cb.

This result is also found from the fact that, when attention is paid to only the numerator of the plaintext, in a case where the plaintext integer a is −1, −(t+1+a)=−{t+1+(−1)}=−t, and in a case where the plaintext integer a is −t, −(t+1+a)=−{t+1+(−t)}=−1. It is confirmed that this result matches the result when the plaintext of the TLWE ciphertext cb is regarded as an integer.

As a result of this process, an offset is added to the plaintext by the term of 1/(4t) added to the terms in the polynomial. Therefore, similarly to the ciphertext ca in FIG. 6A, the position of 0 on the circle group becomes the boundary between slices also in the ciphertext cb in FIG. 7.

As described above, in a case where the plaintext is a negative number, the plaintext to which an integer is assigned is changed. In other words, assuming that the plaintext of the ciphertext cb when being seen as an integer symbol is the same value as the integer of the ciphertext ca, the correspondence between slices for plaintexts of the ciphertext cb and integers is different from that for the ciphertext ca. As for this correspondence, the order of the slices for plaintexts on the circle group is not changed between the ciphertext ca and the ciphertext cb. However, on the left half plane to which negative values are assigned, the order of plaintext integers respectively assigned to plaintexts is inverted.

In FIG. 7 in which t=4 (2t=8), the above-described offset of 0.5 has been added to the plaintext of the ciphertext. Therefore, the plaintexts located at the centers of slices are −3.5/(2t), −2.5/(2t), −1.5/(2t), −0.5/(2t), 0.5/(2t), 1.5/(2t), 2.5/(2t), and 3.5/(2t) from top (½) on the circle group {T} counterclockwise, respectively.

To these slices, −1, −2, −3, −4, 0, 1, 2, and 3 are assigned counterclockwise as plaintext integers of the ciphertext ca that has been used as the input for generating the ciphertext cb, respectively. Integers represented to include the offset of 0.5 are −0.5, −1.5, −2.5, −3.5, 0.5, 1.5, 2.5, and 3.5 from top on the circle group {T}.

Next, the encryption processing device 1 extracts, from the result of an operation of the function f(x), only values in a case where x is non-negative and creates the following test vector polynomial $F_f(X)$.

$$F_f(X) = \sum_{k=0}^{t-1}\left(\frac{f(k+0.5)}{2t} + \frac{1}{4t}\right)\sum_{l=0}^{\frac{n}{t}-1} X^{\frac{n}{t}k+l}$$

The encryption processing device 1 then performs the second Bootstrapping using this test vector polynomial $F_f(X)$ for the ciphertext cb to obtain the TLWE ciphertext cc.

In a case where the TLWE ciphertext cb is non-negative, that is, the plaintext integer a is 0, 1, 2, . . . , the plaintext is located on the right half plane (0 to 0.5) of the circle group. Therefore, the TLWE ciphertext cc is obtained in which the signs are not reversed and which has values of f(0.5), f(1/5), f(2.5), . . . as plaintexts.

Meanwhile, in a case where the TLWE ciphertext cb is negative, that is, the plaintext integer a is −1, −2, −3, . . . , they are arranged in the section from 0.5 to 1 in that order. Therefore, the TLWE ciphertext cc is obtained in which the signs are reversed and which has values of −f(0.5), −f(⅕), −f(2.5), . . . as plaintexts.

If f(x) is an odd function, plaintexts (p(cc) of the ciphertext cc obtained to correspond to a=−1, −2, −3, . . . match f(−0.5), f(−1.5), f(−2.5), . . . , respectively.

That is, together with the non-negative example described above, this example shows that the ciphertext cc satisfying φ(cc)=f(a+0.5) and corresponding to the operation result of the odd function was able to be obtained.

<Application of Method 1>

Method 1 can be applied to all cases of calculating a linear function and corresponds to (a-2) in FIG. 2A.

First, it is assumed that an odd function f(x)=mx (m is a real number). A general formula of linear functions can be presented as ax+b in most cases, however, only if b=0, becomes an odd function.

By using Method 1, φ(cc)=f(a+0.5)=am+0.5m can be calculated. As an additional step to Method 1, a trivial ciphertext (0, m'−0.5m) is added to the TLWE ciphertext cc, and the result is defined as a ciphertext cd. Since consideration is made while the function f, in particular, m is fixed here, m is a constant.

Then, φ(cd)=φ(cc+(0, m'−0.5m))=φ(cc)+m'−0.5m=(am+0.5m)+m'−0.5m=am+m'. Thus, linear functions can be calculated for general purpose.

<Method 2>

A method of calculating a general odd function is described. This method corresponds to (a-3) in FIG. 2A.

Since the linear function described above is also an odd function if the intercept is 0, they can be calculated in the following manner.

A test vector for the first Bootstrapping is changed to the following polynomial $F_{id}$.

$$F'_{id}(X) = \sum_{k=0}^{t-1}\left(\frac{k}{2(t+1)} + \frac{1}{4(t+1)}\right)\sum_{l=0}^{\frac{n}{t}-1} X^{\frac{n}{t}k+l}$$

Figure 8:
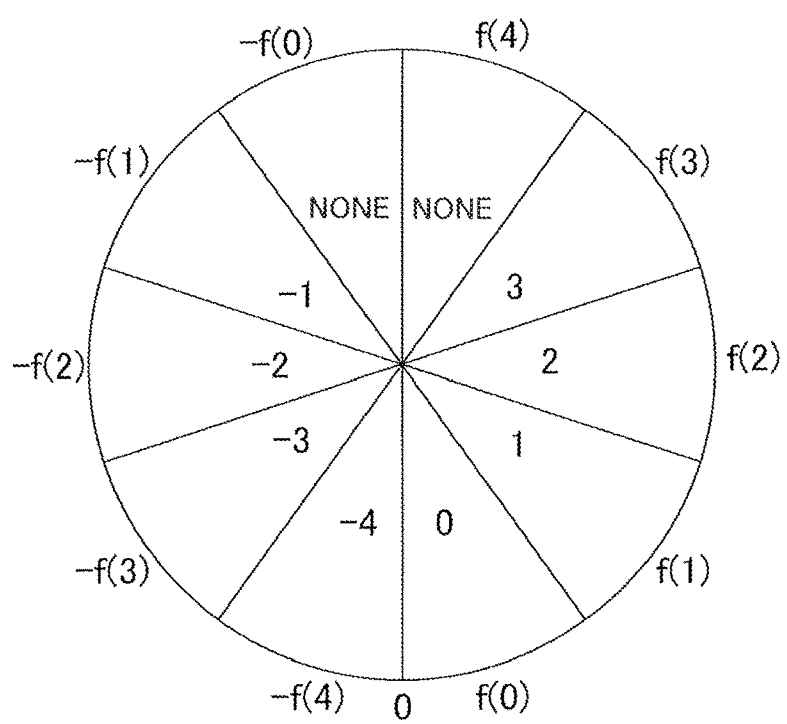
FIG. 8 is an explanatory diagram of Integer-wise type TFHE in the present embodiment.

As illustrated in FIG. 8, the TLWE ciphertext cb is slightly larger in the denominator than that in the case of $F_{id}$ in Method 1 illustrated in FIG. 7, and slices become smaller.

Accordingly, the denominator becomes larger simply, and the plaintext thus comes close to 0 slightly in a case where the plaintext is located on the right half plane of a circle group (i.e., is a non-negative number), as illustrated in FIG. 8. In a case where the plaintext is located on the left half plane (i.e., is a negative number, that is, from −t to −1), the order is inverted from FIG. 6A, and the plaintexts come slightly close to 0.

For example, in a case where a is −1, a is in the section from −1/(2t) to 0 as a value on the circle group. Accordingly, the term of the leading block in $F_{id}$ appears as the last term with the sign reversed, and therefore the plaintext of a TLWE ciphertext after Bootstrapping is −(t−1)/{2(t+1)}−1/{4(t+1)}=−t/{2(t+1)}+1/{4(t+1)} as a value on the circle group and −t as an integer. (The range between the minimum value and the maximum value that can be retained becomes larger because the denominator becomes larger, so that values from −(t+1) to t can be retained.) Further, in a case where a is −t, a is −t/(2t)+1/(4t)=−1/(2t)+1/(4t) as a value on the circle group and is in the closest block to −½. That is, the term of the last block in $F_{id}$ with the sign reversed is obtained as a TLWE ciphertext after Bootstrapping, and therefore the plaintext of the ciphertext after Bootstrapping becomes −1/{4(t+1)}, i.e., −1 as an integer.

Generalizing the above description, in a case where a is positive, the plaintext of the TLWE ciphertext cb becomes a/{2(t+1)}+1/{4(t+1)}, and remains a as an integer.

In a case where a is negative, the plaintext of the TLWE ciphertext cb becomes −(t+1+a)/{2(t+1)}+1/{4(t+1)}, and becomes −(t+1+a) as an integer.

Since the denominator becomes larger and the number of slices is increased by one on each of right and left sides, the coordinate on the circle group is changed. However, when the plaintext is seen as an integer, the symbol thereof is the same as that in Method 1.

Further, in the result of this process, an offset is added due to the term of 1/(4t) that has been added to a term in a polynomial, and the position of 0 on the circle group matches the boundary between the slices as in FIG. 8.

The encryption processing device 1 extracts, from the result of the operation of the function f(x) to be processed, values in a case where x is non-negative to create a test vector polynomial $F_f'(X)$.

$$F_f'(X) = \sum_{k=0}^{t}\left(\frac{f(k)}{2t} + \frac{1}{4t}\right)\sum_{l=0}^{\frac{n}{t+1}-1} X^{\frac{n}{t+1}k+l}$$

The encryption processing device 1 performs Bootstrapping for the TLWE ciphertext cb by using the test vector polynomial $F_f'(X)$ thus created, thereby obtaining the TLWE ciphertext cc.

The function f(x) is a function that uses an integer as an argument and obtains an integer.

Then, as illustrated in FIG. 8, in a case where the TLWE ciphertext cb is non-negative, that is, the plaintext integer a is 0, 1, 2, . . . , these integers are located on the right part (from 0 to 0.5) of the circle group. Therefore, the ciphertext cc is obtained which has f(0), f(1), f(2), . . . as the plaintext without sign reversal.

Further, as illustrated in FIG. 8, in a case where the TLWE ciphertext cb is negative, that is, the plaintext integer a is −1, −2, −3, . . . , these values are arranged in the section from 0.5+½(t+1) to 1. Therefore, the ciphertext cc is obtained in which the signs are reversed and which has −f(1), −f(2), −f(3), . . . , as the plaintext.

If f(x) is an odd function, −f(x)=f(−x).

Therefore, this matches y(cc)=f(a).

Next, a method of calculating an even function is described.

When a function f(x) for a real number x satisfies f(−x)=f(x), the function f(x) is defined as an even function.

<Method 3>

This method corresponds to (b-1) in FIG. 2B.

Figures 9, 10, 11:
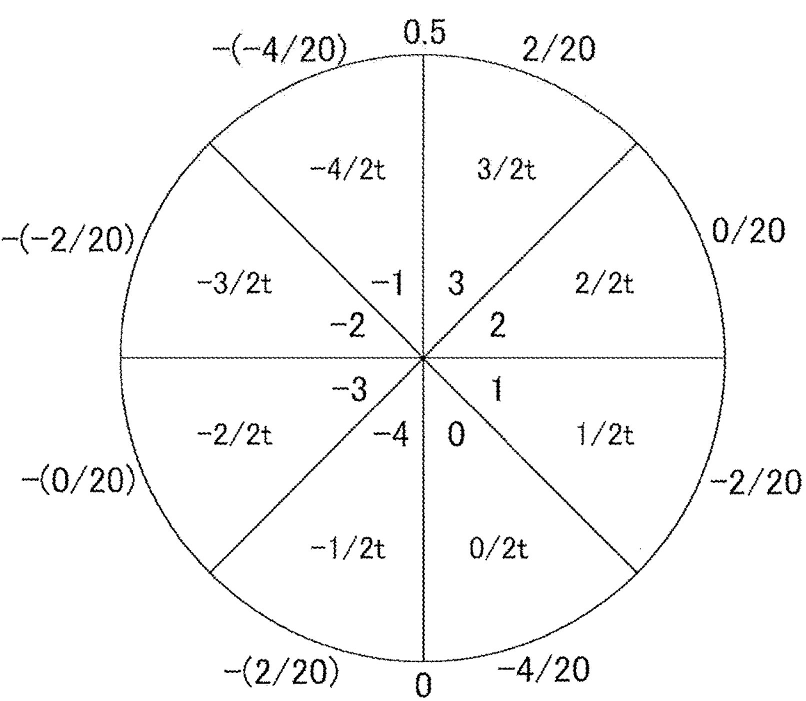
FIG. 9 is an explanatory diagram of Integer-wise type TFHE in the present embodiment.
FIG. 10 is an explanatory diagram of transition of a value of a ciphertext in the present embodiment (even function)
FIG. 11 is an explanatory diagram of transition of a value of a ciphertext in the present embodiment (even function)

The encryption processing device 1 performs the third Bootstrapping for the TLWE ciphertext ca by using the following polynomial $F_{abs}(X)$ $$F_{abs}(X) = \sum_{k=0}^{t-1}\left(\frac{k}{2(t+1)} + \frac{1}{4(t+1)} - \frac{1}{4}\right)\sum_{t=0}^{n/t-1} X^{\frac{n}{t}k+t}$$

as a test vector, thereby obtaining the new ciphertext cb (FIG. 9).

In the ciphertext cb, conversion illustrated in FIGS. 9 and 10 is performed.

FIG. 10 is an explanatory diagram of transition of a value of a ciphertext in the present embodiment (even function) and represents the plaintext of the ciphertext cb obtained as a result of the third Bootstrapping.

In FIG. 9, numerical values on the outer periphery of the right half plane are arranged in the same order as that of coefficients in a test vector polynomial, and numerical values on the left half plane are arranged with the sign reversed while the order thereof is inverted.

The following description is based on a case where t=4.

In a case where the plaintext integer a is non-negative, the plaintext is located on the right half plane of the circle group {T}. Thus, when the denominators in k/{2(t+1)}+1/{4(t+1)}−¼ in $F_{abs}(X)$ are set to 4×(t+1)=20, 2k/{4(t+1)}+1/{4(t+1)}−(t+1)/{4(t+1)}. From this, {2k+1−(t+1)}/20=(2k−4)/20.

Since t=4, the plaintext b of the ciphertext cb is −4/20 for a=0, −2/20 for a=1, . . . , when seen as a value on the circle group, not as an integer, as illustrated in FIG. 9.

As a result of the third Bootstrapping by $F_{abs}$, in a case where the plaintext integer a is negative, the plaintext in the case where the plaintext integer a is non-negative is obtained with the sign reversed in a direction from 0.5 to 1. Thus, the plaintext b of the ciphertext cb is 4/20 for a=−4, which is the value for a=0 with the sign reversed, and is −2/20 for a=−1, which is the value for a=3 with the sign reversed, as illustrated in FIG. 9.

As illustrated in FIG. 10, the value of the plaintext b on the circle group is 4/20 when the plaintext integer a is −4,
2/20 when the plaintext integer a is −3,
0/20 when the plaintext integer a is −2,
−2/20 when the plaintext integer a is −1,
−4/20 when the plaintext integer a is 0,
−2/20 when the plaintext integer a is 1,
0/20 when the plaintext integer a is 2, and
2/20 when the plaintext integer a is 3.

The encryption processing device 1 adds a trivial ciphertext (0, ¼) to the ciphertext cb to obtain the TLWE ciphertext cc. Since ¼ is written as 5/20 by using the common denominator to the above value, 5 is added to the numerator of the plaintext b of the ciphertext cb, so that all the plaintexts b are placed on the right half plane.

As illustrated in FIG. 10, the value of b+5/20 on the circle group is

9/20 when the plaintext integer a is −4,
7/20 when the plaintext integer a is −3,
5/20 when the plaintext integer a is −2,
3/20 when the plaintext integer a is −1,
1/20 when the plaintext integer a is 0,
3/20 when the plaintext integer a is 1,
5/20 when the plaintext integer a is 2, and
7/20 when the plaintext integer a is 3.

Since the denominator of the plaintext b is 20, and the numerator increases by 2, the ciphertext cc can be regarded as a non-negative ciphertext in a case of dividing the entire circle group {T} into 10 (dividing the right half plane into t+1=5) and using it.

Assuming that the circle group is divided into 10, the integer representation of b+5/20 that is the plaintext of the ciphertext cc is as follows, as illustrated in FIG. 10.

When the plaintext integer a is −4, 9/20=4.5/10»4.
When the plaintext integer a is −3, 7/20=3.5/10»3.
When the plaintext integer a is −2, 5/20=2.5/10»2.
When the plaintext integer a is −1, 3/20=1.5/10»1.
When the plaintext integer a is 0, 1/20=0.5/10»0.
When the plaintext integer a is 1, 3/20=1.5/10»1.
When the plaintext integer a is 2, 5/20=2.5/10»2.
When the plaintext integer a is 3, 7/20=3.5/10»3.

As for the order, the value of a becomes larger with increase in the distance from a=0 in the positive and negative directions, and it can be said that an absolute value function has been calculated. That is, φ(cb)=|a|, where || is the symbol for absolute value.

In addition, since the plaintext of the ciphertext cc only uses the right half plane of the circle group {T}, the encryption processing device 1 can evaluate any univariate function by using the method in Micciancio and Polyakov, 2020.

The encryption processing device 1 performs the fourth Bootstrapping for the ciphertext cc by using a function $$F'_f(X)=\sum_{k=0}^{t}\left(\frac{f(k)}{2t}+\frac{1}{4t}\right)\sum_{t=0}^{n/t+1^{-1}} X^{\frac{n}{t+1}k+t},$$

where the function f(x) is a function that uses as an argument an integer and obtains an integer. The ciphertext cd is thus obtained.

Since the ciphertext cb only uses the right half plane as described above, φ(cc)=f(φ(cb)) is established. When φ(cb)= |a| is substituted, φ(cc)=f(|a|) is obtained, where || is the symbol for absolute value.

If f(x) is an even function, f(x)=f(−x), that is, f(x)=f(|x|) is always established in a case where x is a real number. Thus, the above result matches φ(cc)=f(a).

<Method 4>

This method corresponds to (b-2) in FIG. 2B.

Also in a case of an even function, if x in an even function f(x) is shifted by 0.5 and f(x+0.5) is to be obtained by calculation, it is no longer necessary to make the denominator of the plaintext of the intermediate ciphertext cb larger.

FIG. 11 is an explanatory diagram of transition of a value of a ciphertext in the present embodiment (even function) and represents the plaintext of the ciphertext cb obtained as a result of Bootstrapping by a polynomial $F'_{abs}$.

The encryption processing device 1 performs the third Bootstrapping for the ciphertext ca by using the following polynomial $F'_{abs}(X)$ $$F'_{abs}(X)=\sum_{k=0}^{t-1}\left(\frac{k}{2t}+\frac{1}{4t}-\frac{1}{4}\right)\sum_{t=0}^{n/t-1} X^{\frac{n}{t}k+t}$$

as a test vector, thereby obtaining the ciphertext cb.

As illustrated in FIG. 11, the value of the plaintext b on the circle group is −(−3/16) when the plaintext integer a is −4,
−(−1/16) when the plaintext integer a is −3,
−(1/16) when the plaintext integer a is −2,
−(3/16) when the plaintext integer a is −1,
−3/16 when the plaintext integer a is 0,
−1/16 when the plaintext integer a is 1,
1/16 when the plaintext integer a is 2, and
3/16 when the plaintext integer a is 3.

The encryption processing device 1 adds a trivial ciphertext (0, ¼) to the ciphertext cb. Since ¼ is written as 4/16 by using the common denominator to the above value, 4 is added to the numerator of the plaintext b of the ciphertext cb, so that all the plaintexts b are placed on the right half plane.

As illustrated in FIG. 11, the value of b+4/16 on the circle group is

7/16 when the plaintext integer a is −4,
5/16 when the plaintext integer a is −3,
3/16 when the plaintext integer a is −2,
1/16 when the plaintext integer a is −1,
1/16 when the plaintext integer a is 0,
3/16 when the plaintext integer a is 1,
5/16 when the plaintext integer a is 2, and
7/16 when the plaintext integer a is 3.

Since the denominator of the plaintext b is 16, and the numerator increases by 2, the ciphertext cc can be regarded as a non-negative ciphertext in a case of dividing the entire circle group {T} into eight (dividing the right half plane into t=4) and using it.

Assuming that the circle group is divided into eight, the integer representation of b+4/16 that is the plaintext of the ciphertext cc is as follows, as illustrated in FIG. 11.

When the plaintext integer a is −4, 7/16=3.5/8»3.5.
When the plaintext integer a is −3, 5/16=2.5/8»2.5.
When the plaintext integer a is −2, 3/16=1.5/8»1.5.
When the plaintext integer a is −1, 1/16=0.5/8»0.5.
When the plaintext integer a is 0, 1/16=0.5/8»0.5.
When the plaintext integer a is 1, 3/16=1.5/8»1.5.
When the plaintext integer a is 2, 5/16=2.5/8»2.5.
When the plaintext integer a is 3, 7/16=3.5/8»3.5.

It is found from FIG. 11 that the absolute value function has been calculated by turning back at the position of 0 on the circle group. It can be said that φ(cc)=|a+0.5|. When a2 is defined as a+0.5, φ(cc)=|a2|, where || is the symbol for absolute value.

The encryption processing device 1 performs the fourth Bootstrapping for the ciphertext cc by using the above univariate function $F'_f(X)$ as a test vector to obtain the ciphertext cd. This case is the same as the above case in using the right half plane only.

Then, φ(cd)=f(|a+0.5|) is obtained. If f(x) is an even function, f(x)=f(−x)=f(|x|) is satisfied, and therefore φ(cd) =f(a+0.5).

Figure 12A:
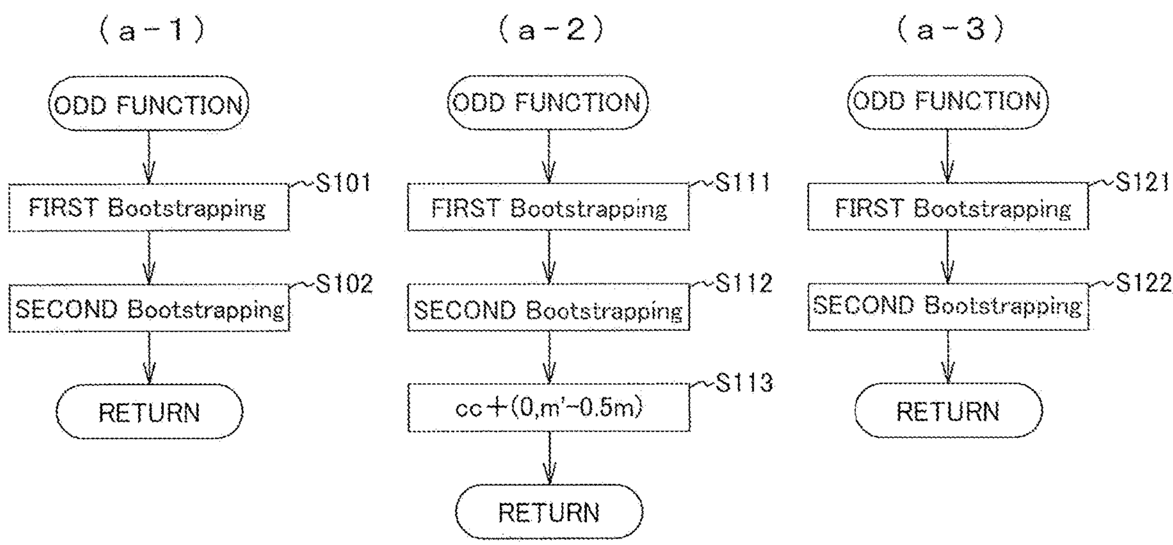
FIGS. 12A and 12B are flowcharts for explaining processes of calculating an odd function and an even function performed by the encryption processing device according to the present embodiment.
Figure 12B:
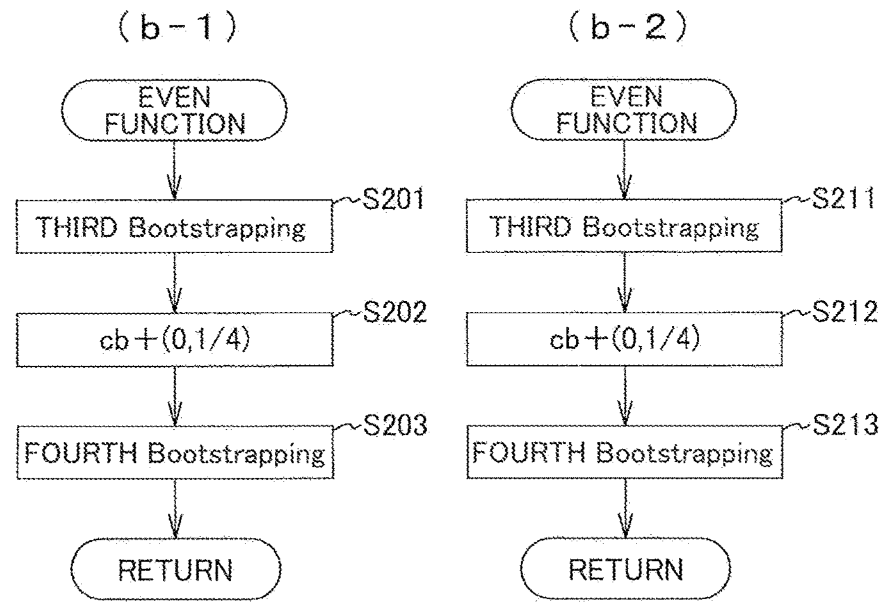

FIGS. 12A and 12B are flowcharts for explaining processes of calculating an odd function and an even function performed by the encryption processing device according to the present embodiment.

FIG. 12A illustrates the process of calculating an odd function.

In (a-1), the encryption processing device 1 (the first Bootstrapping unit 41) performs the first Bootstrapping for the TLWE ciphertext ca by using the univariate function $F_{id}(X)$ as a test vector, thereby obtaining the TLWE ciphertext cb at Step S101.

At Step S102, the encryption processing device 1 (the second Bootstrapping unit 42) performs the second Bootstrapping for the ciphertext cb by using the univariate function $F_f(X)$ as a test vector, thereby obtaining the ciphertext cc that corresponds to the result of calculation of an odd function.

In (a-2), the encryption processing device 1 (the first Bootstrapping unit 41) performs the first Bootstrapping for the TLWE ciphertext ca by using the univariate function $F_{id}(X)$ as a test vector, thereby obtaining the TLWE ciphertext cb at Step S111.

At Step S112, the encryption processing device 1 (the second Bootstrapping unit 42) performs the second Bootstrapping for the ciphertext cb by using the univariate function $F_f(X)$ as a test vector, thereby obtaining the ciphertext cc.

At Step S113, the encryption processing device 1 (the first operation unit 12) performs a homomorphic operation of cc+(0, m'−0.5m) for the ciphertext cc and obtains the new ciphertext cd that corresponds to the result of calculation of an odd function.

In (a-3), the encryption processing device 1 (the first Bootstrapping unit 41) performs the first Bootstrapping for the TLWE ciphertext ca by using the univariate function $F'_{id}(X)$ as a test vector, thereby obtaining the TLWE ciphertext cb at Step S121.

At Step S122, the encryption processing device 1 (the second Bootstrapping unit 42) performs the second Bootstrapping for the ciphertext cb by using the univariate function $F'_f(X)$ as a test vector, thereby obtaining the ciphertext cc that corresponds to the result of calculation of an odd function.

FIG. 12B illustrates the process of calculating an even function.

In (b-1), the encryption processing device 1 (the third Bootstrapping unit 43) performs the third Bootstrapping for the TLWE ciphertext ca by using the univariate function $F_{abs}(X)$ as a test vector, thereby obtaining the TLWE ciphertext cb at Step S201.

At Step S202, the encryption processing device 1 (the second operation unit 13) performs a homomorphic operation cb+(0, ¼) for the ciphertext cb, thereby obtaining the TLWE ciphertext cc.

At Step S203, the encryption processing device 1 (the fourth Bootstrapping unit 44) performs the fourth Bootstrapping for the ciphertext cc by using the univariate function $F'_f(X)$ as a test vector, thereby obtaining the ciphertext cd that corresponds to the result of calculation of an even function.

In (b-2), the encryption processing device 1 (the third Bootstrapping unit 43) performs the third Bootstrapping for the TLWE ciphertext ca by using the univariate function $F'_{abs}(X)$ as a test vector, thereby obtaining the TLWE ciphertext cb at Step S211.

At Step S212, the encryption processing device 1 (the second operation unit 13) performs a homomorphic operation cb+(0, ¼) for the ciphertext cb, thereby obtaining the TLWE ciphertext cc.

At Step S213, the encryption processing device 1 (the fourth Bootstrapping unit 44) performs the fourth Bootstrapping for the ciphertext cc by using the univariate function $F_f(X)$ as a test vector, thereby obtaining the ciphertext cd that corresponds to the result of calculation of an even function.

The configuration and the processes of the encryption processing device according to the present embodiment for calculating an even function or an odd function have been explained in the above description. In the following description, a configuration and processes of the encryption processing device according to the present embodiment for calculating any univariate function by applying the operation and the processing method used in calculation of an even function or an odd function.

Figure 13:
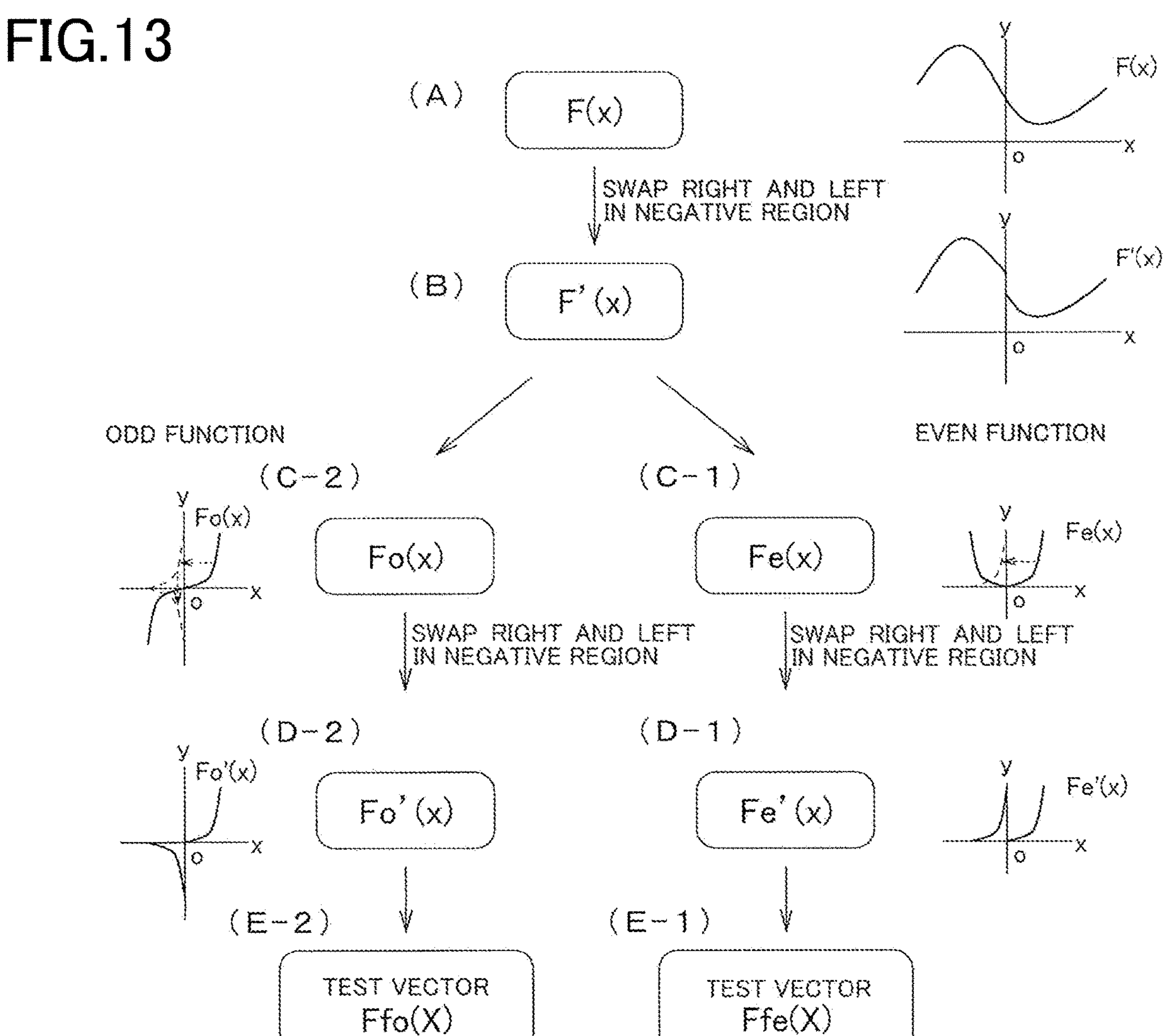
FIG. 13 is an explanatory diagram of a method for executing calculation of any univariate function by the encryption processing device according to the present embodiment.

FIG. 13 is an explanatory diagram of a method for executing calculation of any univariate function by the encryption processing device according to the present embodiment.

FIG. 13 illustrates a preparatory stage for high-speed processing of calculation of any univariate function by the encryption processing device 1 by a small number of times of BlindRotate, the preparatory stage being based on the univariate function to be calculated.

"Putting up the swiss army knife of homomorphic calculations by means of TFHE functional bootstrapping, Pierre-Emmanuel Clet, Martin Zuber, Aymen Boudguiga, Renaud Sirdey, and Cedric Gouy-Pailler (hereinafter, Clet et al.)" discloses decomposing any univariate function to be calculated into an even function and an odd function, obtaining a ciphertext of an operation result for each of them, and adding the ciphertexts together finally, thereby obtaining a ciphertext of a result of calculation of the univariate function.

As for decomposition of a function into an even function and an odd function, the following formulas are defined by using any univariate function f(x).

$$f_e(x) = \frac{f(x) + f(-x)}{2}$$

$$f_o(x) = \frac{f(x) - f(-x)}{2}$$

When both are added together simply, f(x)=fe(x)+fo(x). Therefore, these two functions fe(x) and fo(x) are results of decomposition of the univariate function f(x) into two. Further, from the form of the formula, it is found that, even if the sign of x in fe(x) is reversed, only change caused by the sign reversal is swap of the left side and the right side of sign + in the formula. Therefore, fe(x)=fe(−x) is established, and fe(x) is an even function.

Similarly, when the sign of x in fo(−x) is reversed, f in the left side and f in the right side of sign − in the formula are exchanged, so that the same form as −fo(x) is obtained. That is, fo(−x)=−fo(x) is established, and fo(x) is an odd function.

From the above discussion, obtaining fe(x) and fo(x) in the above-described manner is equivalent to decomposing the univariate function f(x) into an even function and an odd function.

The above discussion is established for any univariate function without specifying whether what is assigned to x is a real number, an integer, or a complex number and specifying whether f(x) is a polynomial, for example.

Therefore, fe(x) and fo(x) can be calculated by Method 2 and Method 3. In that case, BlindRotate is performed twice for obtaining each of the result of calculation of the even function fe(x) and the result of calculation of the odd function fo(x).

Clet et al. show that any univariate function can be processed by BlindRotate performed four times and further show that the number of times of BlindRotate can be reduced to three by adopting a method of evaluating a plurality of LUT, such as many LUT. The method called many LUT reduces the number of times of BlindRotate by performing BlindRotate using a plurality of test vector polynomials for the same input ciphertext simultaneously.

Meanwhile, according to the present embodiment, instead of decomposing a univariate function to be calculated into the even function fe(x) and the odd function fo(x) and performing calculation for each of them, the univariate function is decomposed into functions with different forms, and calculation is performed.

Thus, according to the present embodiment, any univariate function can be processed at higher speed by BlindRotate performed three times without many LUT or twice when many LUT is used.

The following description will be made by referring to functions transformed from an even function and an odd function as the functions with different forms. However, the functions with different forms are not limited thereto.

First, as illustrated in (A), the univariate function F(x) to be calculated is prepared. This function is at least defined to have the x coordinate obtained by adding 0.5 to an integer in a range from −t to t−1, inclusive, similarly to Method 1 and Method 4 described above. That is, when x is an integer between −t and t−1, inclusive, F(x+0.5) can be calculated.

Next, in (B), the encryption processing device 1 swaps right and left (in the x-axis direction) only in a region where the input x in F(x) is negative, thereby obtaining a univariate function F'(x).

F'(x) is defined as follows.

$$F'(x) = \begin{cases} F(x) & \text{if } t > x \geq 0 \\ F(-t-x) & \text{if } -t \leq x < 0 \end{cases}$$

F'(x) is defined to have the input x in the section of −t or more and less than t, which satisfies a condition for any univariate function.

The encryption processing device 1 decomposes this F'(x) into the even function Fe(x) represented in (C-1) and the odd function Fo(x) represented in (C-2) by the above-described method.

Then, a ciphertext of the operation result of Fe'(x) deformed from Fe(x) and a ciphertext of the operation result of Fo'(x) deformed from Fo(x) are obtained as described later, and thereafter these ciphertexts are added together. A ciphertext of the operation result of F(x) is thus obtained.

Specifically, Fe(x) and Fo(x) are as follows.

$$Fe(x) = \frac{F'(x) + F'(-x)}{2} = \begin{cases} \frac{F(x) + F(-t+x)}{2} & \text{if } t > x \geq 0 \\ \frac{F(-t-x) + F(-x)}{2} & \text{if } -t \leq x < 0 \end{cases} = \frac{F(\|x\|) + F(\|x\| - t)}{2}$$

$$Fo(x) = \frac{F'(x) - F'(-x)}{2} = \begin{cases} \frac{F(x) - F(-t+x)}{2} = \frac{F(\|x\|) - F(\|x\| - t)}{2} & \text{if } t > x \geq 0 \\ \frac{F(-t-x) - F(-x)}{2} = \frac{F(\|x\|) - F(\|x\| - t)}{2} & \text{if } -t \leq x < 0 \end{cases}$$

Fe(x) that can be calculated for x by using the absolute value only is an even function. Meanwhile, Fo(x) is an odd function because formulas in the positive region and the negative region are the same except that the signs are reversed.

The encryption processing device 1 swaps right and left in the negative region for these two functions, thereby obtaining Fe'(x) represented in (D-2) and Fo'(x) represented in (D-3).

By the operations described above, Fo'(x) is a function in which a value obtained by sliding the value of the output y in a region where the value of x is positive in the x-axis direction by ½ and reversing the sign of the slid value is set to the value of the output y in the region where the value of the input x is negative in the odd function Fo(x).

Further, Fe'(x) is a function in which a value obtained by sliding the value of the output y in a region where the value of x is positive in the x-axis direction by ½ is set to the value of the output y in the region where the value of the input x is negative in the even function Fe(x).

Fe'(x) and Fo'(x) are the following functions.

$$Fe'(x) = \begin{cases} Fe(x) = \frac{F(x) + F(-t+x)}{2} & \text{if } t > x \geq 0 \\ Fe(-t-x) = \frac{F(x) + F(t+x)}{2} & \text{if } -t \leq x < 0 \end{cases}$$

$$Fo'(x) = \begin{cases} Fo(x) = \frac{F(x) - F(-t+x)}{2} & \text{if } t > x \geq 0 \\ Fo(-t-x) = \frac{F(x) - F(t+x)}{2} & \text{if } -t \leq x < 0 \end{cases}$$

When 0≤x<t, Fe'(x)=Fe'(x−t) and Fo'(x)=−Fo'(x−t) are established.

Therefore, Fo'(x) satisfies the constraint presented in Micciancio and Polyakov, 2020 and the property of f(v+½)=−f(v), where v is a value on a circle group. ½ that is added means a half plane on the circle group, and is therefore equivalent to ±t as an integer symbol.

The encryption processing device 1 can create a test vector polynomial $F_{fo}(X)$ including, as coefficients, the value of the univariate function Fo'(x)

$$F_{fo}(X) = \sum_{k=0}^{t-1} \left( \frac{Fo'(k+0.5)}{2t} + \frac{1}{4t} \right) \sum_{i=0}^{n/t-1} X^{\frac{n}{t}k+l}$$

as represented in (E-1).

The encryption processing device 1 can create a test vector polynomial $F_{fe}(X)$ including, as coefficients, the value of the univariate function Fe'(x)

$$F_{fe}(X) = \sum_{k=0}^{t-1} \left( \frac{Fe'(k+0.5)}{2t} + \frac{1}{4t} \right) \sum_{i=0}^{n/t-1} X^{\frac{n}{t}k+l}$$

as represented in (E-2).

Each of the test vector polynomials $F_{fo}(X)$ and $F_{fe}(X)$ can refer to LUT and output the operation result of a function by setting the output of the univariate function to coefficients and performing Bootstrapping, similarly to $F_f(X)$ described in Method 1.

Furthermore, in each of Fo'(x) and Fe'(x), the order of values has already been reversed in the negative region. Therefore, the test vector polynomials $F_{fo}(X)$ and $F_{fe}(X)$ in which these functions are set to coefficients do not require the process of reversing a negative plaintext on a circle group by using $F_{id}$ described in Method 1.

On the right half plane of the circle group from 0 to 0.5, coefficients are arranged from minimum to maximum. On the left half plane from 0.5 to 1, coefficients are arranged from minimum to maximum with the sign reversed. If the circle group is in the state illustrated in FIG. 6A, it is difficult to handle both the positive region and the negative region well in BlindRotate, and therefore Bootstrapping has to be performed twice for calculation of each of an even function and an odd function. Actually, in Method 1, the order of integers is reversed by Bootstrapping using $$F_{id}(X) = \sum_{k=0}^{t-1} \left( \frac{k}{2t} + \frac{1}{4t} \right) \sum_{i=0}^{n/t-1} X^{\frac{n}{t}k+l},$$

and thereafter Bootstrapping using $$F_f(X) = \sum_{k=0}^{t-1} \left( \frac{f(k+0.5)}{2t} + \frac{1}{4t} \right) \sum_{i=0}^{n/t-1} X^{\frac{n}{t}k+l}$$

is performed, whereby the value of the function is obtained. Meanwhile, in a case of performing homomorphic addition, for example, the order in FIG. 6A in which the maximum value in the negative direction to the maximum value in the positive direction are successively arranged is more convenient to handle both the positive and negative values.

In the present embodiment, the order of integers in the negative region is reversed in each of the univariate function Fo'(x) and the univariate function Fe'(x) included in the test vector polynomials. Thus, as for the left half plane that is negative, calculation of an even function and an odd function can be performed, while the same effects as those in a case where the order of integers is reversed to the state in FIG. 7 are obtained.

Each of calculation of an even function and calculation of an odd function can be realized by performing Bootstrapping using the test vector polynomial $F_{fo}(X)$ or the test vector polynomial $F_{fe}(x)$ only once.

All of obtaining the function F'(x) in which negative values are reversed, separation of the odd function Fo(x) and the even function Fe(x), and obtaining the function Fo'(x) in which negative values are reversed and the function Fe'(x) need not be performed by the encryption processing device 1. A part of all of them may be calculated and created by another device and input to the encryption processing device 1.

Figure 14:
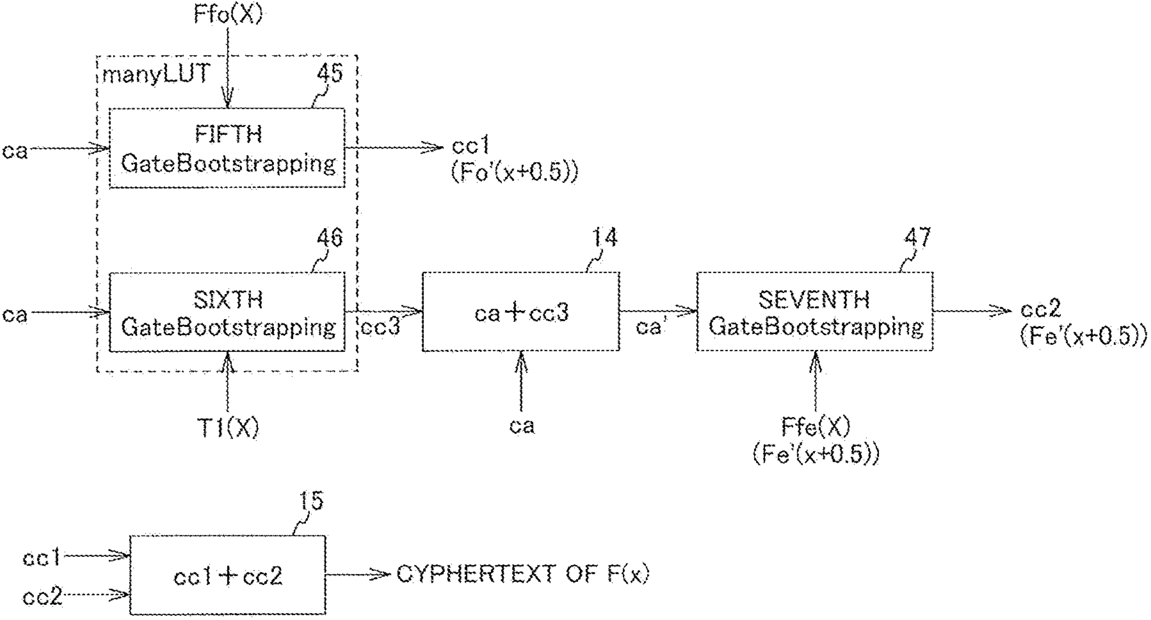
FIG. 14 is an explanatory diagram of a configuration for executing calculation of any univariate function by the encryption processing device according to the present embodiment.

FIG. 14 is an explanatory diagram of a configuration of the encryption processing device according to the present embodiment for executing calculation of any univariate function.

The encryption processing device 1 inputs the ciphertext ca to the fifth Bootstrapping unit 45 and performs the fifth Bootstrapping using the test vector polynomial $F_{fo}$ to obtain a ciphertext cc1. The ciphertext cc1 has a value of Fo'(x+0.5) as the plaintext.

Since Fe'(x) becomes f(v+½)=f(v), the test vector polynomial $F_{fe}(X)$ cannot be applied to the ciphertext ca as it is.

However, Fe'(x) becomes the same as that obtained in a case where a half-turn has occurred on the circle group. Therefore, it suffices to determine which one of the section from 0 to 0.5 (the left half plane) and the section from 0.5 to 1 (the right half plane) on the circle group the plaintext a is located in and to rotate the determined one half a turn on the circle group by addition of ½. The encryption processing device 1 inputs the ciphertext ca to the sixth Bootstrapping unit 46 and performs the sixth Bootstrapping for the TLWE ciphertext ca by using a test vector polynomial T1(X) in which all coefficients are ¼.

Thus, a ciphertext cc3 having either of two values as the plaintext is obtained which has ¼ as the plaintext if the plaintext a of the ciphertext ca is from 0 to 0.5 on the circle group and from 0 to t−1 as an integer, and has −¼ as the plaintext if the plaintext a is from 0.5 to 1 on the circle group and from −t to −1 as an integer. The ciphertext cc3 indicates whether the plaintext a of the ciphertext ca is located on the left half plane on the circle group or the right half plane.

The encryption processing device 1 inputs the ciphertext cc3 and the ciphertext ca to the third operation unit 14 and performs homomorphic addition between the ciphertext ca and the ciphertext cc3. As a result, if the plaintext a of the ciphertext ca is located on the left half plane, the plaintext a moves to the right half plane because of addition of the ciphertext cc3. If the plaintext of the ciphertext ca is located on the right half plane, the plaintext remains on the right half plane because of addition of the ciphertext cc3.

Therefore, a ciphertext ca' obtained by adding the ciphertext cc3 to the ciphertext ca only uses the region from 0 to 0.5 on the right half plane of the circle plane.

However, the above operation only provides integer representation using the range from −¼ to ¼, instead of using the range from 0 to 0.5. It is thus more preferable to further subtract a trivial ciphertext (0, ¼) in a homomorphic manner in a case where the range from 0 to 0.5 is to be used.

The encryption processing device 1 inputs the ciphertext ca' to the seventh Bootstrapping unit 47 and performs the seventh Bootstrapping for the ciphertext ca' by using the test vector polynomial $F_{fe}(X)$, thereby obtaining a ciphertext cc2. The ciphertext cc2 has a value of Fe'(x+0.5) as the plaintext.

Up to this point, Bootstrapping (BlindRotate) is performed three times.

Finally, the encryption processing device 1 inputs the ciphertext cc1 and the ciphertext cc2 to the fourth operation unit 16 and adds the ciphertext cc1 and the ciphertext cc2 together in a homomorphic manner. The encryption processing device 1 can thus obtain a ciphertext of the univariate function F(x).

From the above calculation, $$Fe'(x) = \begin{cases} \dfrac{F(x) + F(-t + x)}{2} & \text{if } t > x \geq 0 \\ \dfrac{F(x) + F(t + x)}{2} & \text{if } -t \leq x < 0 \end{cases}$$

$$Fo'(x) = \begin{cases} \dfrac{F(x) - F(-t + x)}{2} & \text{if } t > x \geq 0 \\ \dfrac{F(x) - F(t + x)}{2} & \text{if } -t \leq x < 0 \end{cases}$$

are obtained. Therefore, $$Fe'(x) + Fo'(x) = \begin{cases} \dfrac{F(x) + F(-t + x)}{2} + \dfrac{F(x) - F(-t + x)}{2} = F(x) & \text{if } t > x \geq 0 \\ \dfrac{F(x) + F(t + x)}{2} + \dfrac{F(x) - F(t + x)}{2} = F(x) & \text{if } -t \leq x < 0 \end{cases}$$

is established, and Fe'(x+0.5)+Fo'(x+0.5)=F(x+0.5) is established regardless of the value of x.

The fifth Bootstrapping and the sixth Bootstrapping are processes for the same ciphertext. Therefore, the number of times of BlindRotate can be made once by using manyLUT that refers to a plurality of test vector polynomials (LUTs) at the same time during BlindRotate. Consequently, the number of times of BlindRotate can be made twice as a whole when the seventh Bootstrapping is considered together.

Figure 15:
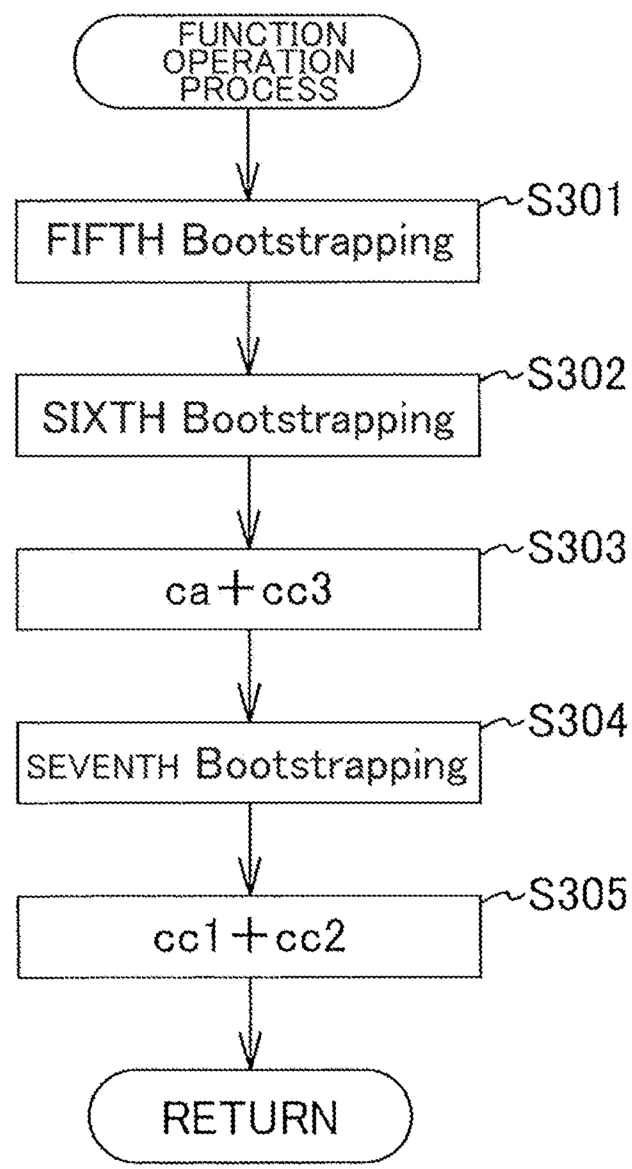
FIG. 15 is a flowchart for explaining a process by the encryption processing device according to the present embodiment for calculating a univariate function.

FIG. 15 is a flowchart for explaining a process by the encryption processing device according to the present embodiment for calculating a univariate function.

The encryption processing device 1 (the fifth Bootstrapping unit 45) executes the fifth Bootstrapping for the input ciphertext ca by using $F_{fo}(X)$ as a test vector polynomial, thereby obtaining the ciphertext cc1 at Step S301.

The encryption processing device 1 (the sixth Bootstrapping unit 46) executes the sixth Bootstrapping for the input ciphertext ca by using the test vector polynomial T1(X), thereby obtaining the ciphertext cc3 at Step S302.

The encryption processing device 1 (the third operation unit 14) performs a homomorphic operation between the ciphertext ca and the ciphertext cc3 to obtain the ciphertext ca' at Step S303.

The encryption processing device 1 (the seventh Bootstrapping unit 47) executes the seventh Bootstrapping for the ciphertext ca' by using $F_{fe}(X)$ as a test vector polynomial, thereby obtaining the ciphertext cc2 at Step S304.

The encryption processing device 1 (the fourth operation unit 15) performs a homomorphic operation between the ciphertext cc1 and the ciphertext cc2 to obtain a ciphertext corresponding to the calculation result of any univariate function F(x) at Step S305.

FIGS. 16A and 16B are diagrams illustrating ciphertexts input to and output from Gate Bootstrapping according to the present embodiment.

In the above descriptions, Gate Bootstrapping, in particular, the first Bootstrapping has been described as being performed in the order of BlindRotate, SampleExtract, and Public Key Switching, as illustrated in FIG. 16A.

The order is not limited thereto. In Gate Bootstrapping, Public Key Switching can be performed first, and thereafter BlindRotate and SampleExtract can be performed, as illustrated in FIG. 16B.

As for TLWE ciphertexts, there is a concept of levels depending on security strengths.

In Gate Bootstrapping in FIG. 16A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVEL1. However, as a result of Public Key Switching, a LEVEL0 TLWE ciphertext is output.

Meanwhile, in the method illustrated in FIG. 16B, TLWE ciphertexts as input and output of the Gate Bootstrapping are set to LEVEL1, and Public Key Switching is performed first to lower the level to LEVEL0. In this state, BlindRotate is performed. When SampleExtract is then performed for the TRLWE ciphertext as the output of BlindRotate, a LEVEL1 TLWE ciphertext is output.

The LEVEL0 ciphertext is formed by an N-th order vector [a] of elements on the circle group {T} encrypted with an N-th order private key [s]. Meanwhile, the LEVEL1 ciphertext obtained as a result of SampleExtract is formed by an n-th order vector [a'] of elements on the circle group {T} encrypted with an n-th order private key [s'].

In the LEVEL0 ciphertext, the number of coefficients (the order of the vector) contributing to difficulty of the LWE problem is smaller than that in the LEVEL1 ciphertext, and thus the amount of calculation of homomorphic addition is smaller as compared with the LEVEL1 ciphertext.

On the other hand, the LEVEL0 ciphertext has a problem that the security strength tends to decrease when an allowable error added to a plaintext is made small. This is because in LWE encryption, the security is ensured by the error added to the plaintext.

In TLWE encryption, calculation (decipher) is more difficult as the error added to the plaintext is larger and the number of coefficients (the order of the vector) is larger.

In other words, regarding TLWE encryption, the smaller the error added to the plaintext is and the smaller the number of coefficients (the order of the vector) is, the easier calculation (decipher) is.

In particular, in TFHE applied to the Integer-wise type, it is necessary to divide the range from 0 to 1 of the circle group {T} more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure security by increasing the number of coefficients (the order of the vector) in the ciphertext.

In order to ensure the security of the ciphertext that is easy to calculate (decipher) by reducing the error added to the plaintext, it is desirable to move Public Key Switching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by Public Key Switching as input.

Further, making an error to be added to a plaintext smaller has a problem of an error in decryption in addition to the above-described problem of security strength.

As described above, in TFHE applied to Integer-wise type, the range from 0 to 1 associated with the circle group {T} is divided into 2t. When the value oft is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a device to which the present embodiment is applied.

Application Example

The encryption processing device 1 performs calculation of an odd function by using the functions of the first operation unit 12, the first Bootstrapping unit 41, and the second Bootstrapping unit 42.

The encryption processing device 1 also performs calculation of an even function by using the functions of the second operation unit 13, the third Bootstrapping unit 43, and the fourth Bootstrapping unit 44.

Further, the encryption processing device 1 performs calculation of any univariate function by using the functions of the third operation unit 14, the fourth operation unit 15, the fifth Bootstrapping unit 45, the sixth Bootstrapping unit 46, and the seventh Bootstrapping unit 47.

The processes performed by the encryption processing device 1 can be applied in the following manner.

Specific application examples include fuzzy authentication such as biometric authentication (since this authentication uses data that does not change over a lifetime, it is an absolute condition to conceal the data, and determination is made whether to match the data by using a threshold value), fuzzy search that searches an encrypted database for ambiguous and close data, and query aggregation from the encrypted database.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other, because, even if biological information is measured accurately, it is not always possible to obtain exactly the same value.

Fuzzy search is an ambiguous search method in which data close to a query is presented as a search result from a database even if the query and a record do not completely match.

In fuzzy authentication and fuzzy search, it is necessary to perform various operations for data encrypted by homomorphic encryption when a query to the encrypted database is executed. Those operations include an operation using a function that is a univariate function and an even function or an odd function. For example, in a case of using the Euclidean distance for calculating the degree of coincidence with a fingerprint registered in fuzzy authentication, $x^2$, which is an even function, is calculated. Further, in a case of converting the scale for normalization of a vector, for example, multiplication of the scale, i.e., the first-degree polynomial, which is an odd function, is calculated. Furthermore, any univariate function that can be calculated by calculating an even function or an odd function is also necessary when fuzzy authentication, fuzzy search, and a query for an encrypted database are executed.

The fact that a desired variable function can be calculated while being encrypted is useful also in calculation of cosine similarity that is used for, for example, evaluating the similarity between sentences and is obtained by dividing the inner product of two vectors by their respective norms.

Figure 17:
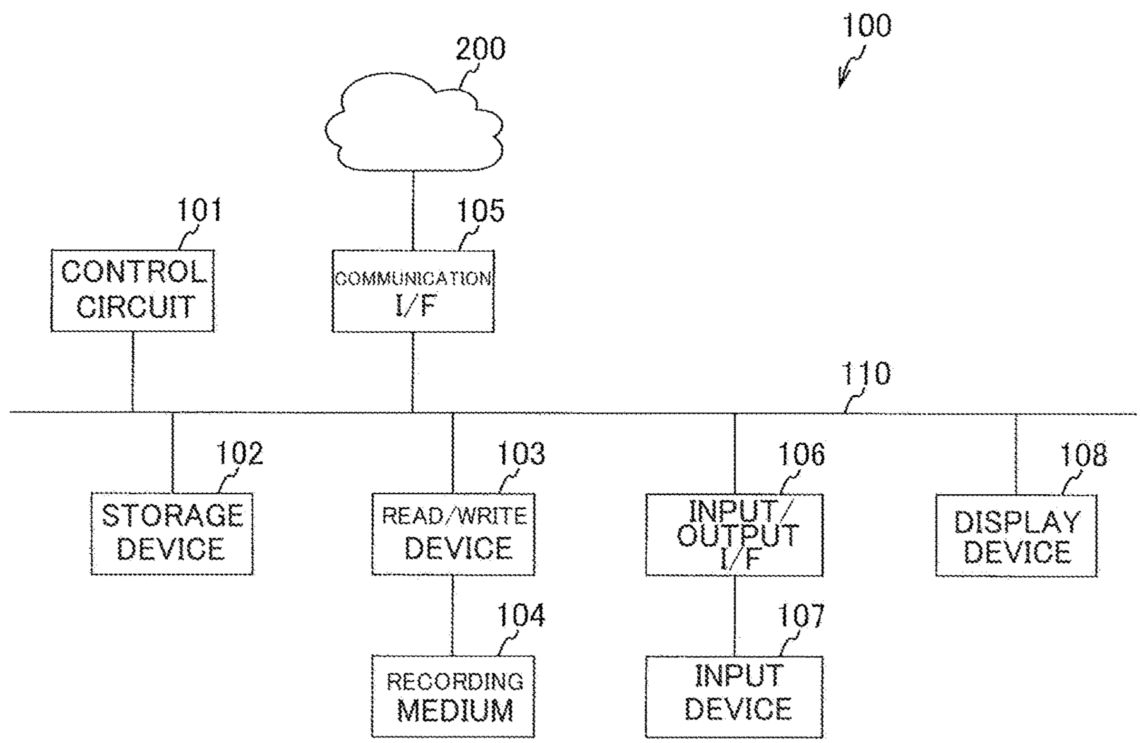
FIG. 17 is a block diagram illustrating an example of a computer device.

FIG. 17 is a block diagram illustrating an example of a computer device.

A configuration of a computer device 100 is described with reference to FIG. 17.

The computer device 100 is, for example, an encryption processing device that processes various types of information. The computer device 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by selecting a part of or all elements from the constituent elements incorporated in the computer device 100 as appropriate.

The control circuit 101 controls the entire computer device 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores various types of data therein. For example, the storage device 102 is a memory such as a Read Only Memory (ROM) and a Random Access Memory (RAM), or a non-transitory computer-readable recording medium such as a Hard Disk (HD) and a Solid State Drive (SSD). The storage device 102 may store therein an information processing program that causes the control circuit 101 to function as the controller 10 in FIG. 1. The storage device 102 functions as the storage unit 20 in FIG. 1, for example.

The encryption processing device 1 loads a program stored in the storage device 102 into a RAM when performing information processing.

The encryption processing device 1 executes the program loaded to the RAM by the control circuit 101 as for an operation of an odd function, thereby executing processing that includes at least one of a receiving process, the first operation process, the first Bootstrapping process, the second Bootstrapping process, and an output process.

The encryption processing device 1 executes the program loaded to the RAM by the control circuit 101 as for an operation of an even function, thereby executing processing that includes at least one of a receiving process, the second operation process, the third Bootstrapping process, the fourth Bootstrapping process, and an output process.

Further, the encryption processing device 1 executes the program loaded to the RAM by the control circuit 101 as for an operation of any univariate function, thereby executing processing that includes at least one of a receiving process, the third operation process, the fourth operation process, the fifth Bootstrapping process, the sixth Bootstrapping process, the seventh Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a nonvolatile memory (a non-transitory computer-readable recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer device 100 and another device to each other via the network 200 in a communicable manner. The communication interface 105 functions as the communication unit 25 in FIG. 1, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer device 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer device 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing device that processes a ciphertext, the ciphertext being a fully homomorphic ciphertext that has a value obtained by adding an error with a predetermined variance to a predetermined value, as a plaintext associated with an integer and that enables a predetermined operation between integers without decryption, the device comprising a processor that executes a process and a storage device, the process including:

preparing a first polynomial and a second polynomial respectively including a second function and a third function, and a fourth polynomial and storing the first polynomial and the second polynomial, and the fourth polynomial in the storage device, the second function and the third function being generated by decomposing a first function as a calculation object;

rotating coefficients of the first polynomial based on a first ciphertext stored in the storage device to obtain the third polynomial, extracting a predetermined coefficient of the third polynomial to obtain a second ciphertext and storing the second ciphertext in the storage device;

rotating coefficients of the fourth polynomial based on the first ciphertext to obtain a fifth polynomial, extracting a predetermined coefficient of the fifth polynomial to obtain a fifth ciphertext, rotating coefficients of the second polynomial based on a sixth ciphertext obtained by homomorphically adding the first ciphertext and the fifth ciphertext, to obtain a sixth polynomial, extracting a predetermined coefficient of the sixth polynomial to obtain a third ciphertext and storing the third ciphertext in the storage device; and performing a homomorphic operation using the second ciphertext and the third ciphertext that are stored in the storage device to obtain a fourth ciphertext corresponding to a result of calculation of the first function which uses the first ciphertext as input.

2. The encryption processing device according to claim 1, wherein the second function included in the first polynomial is obtained by, in a function obtained by decomposing the first function, setting a value obtained by sliding a value of an output y in a region where a value of an input x is positive by ½ in an x-axis direction and reversing a sign, to the value of the output y in a region where the value of the input x is negative, and rotating the coefficients of the first polynomial based on the first ciphertext to obtain the third polynomial and extracting the predetermined coefficient of the third polynomial to obtain the second ciphertext enables the second ciphertext based on a result of an operation of the second function to be obtained regardless of whether a plaintext of the first ciphertext is positive or negative.

3. The encryption processing device according to claim 2, wherein the function obtained by decomposing the first function is an odd function.

4. The encryption processing device according to claim 1, wherein the third function included in the second polynomial is obtained by, in a function obtained by decomposing the first function, setting a value obtained by sliding a value of an output y in a region where a value of an input x is positive by ½ in an x-axis direction, to the value of the output y in a region where the value of the input x is negative, and rotating the coefficients of the first polynomial based on the first ciphertext to obtain the third polynomial and extracting the predetermined coefficient of the third polynomial to obtain the second ciphertext enables the second ciphertext based on a result of an operation of the third function to be obtained regardless of whether a plaintext of the first ciphertext is positive or negative.

5. The encryption processing device according to claim 4, wherein the function obtained by decomposing the first function is an even function.

6. The encryption processing device according to claim 1, wherein the first polynomial is represented as $F_{fo}$ satisfying $$F_{fo}(X) = \sum_{k=0}^{t-1}\left(\frac{Fo'(k+0.5)}{2t} + \frac{1}{4t}\right)\sum_{l=0}^{n/t-1} X^{\frac{n}{t}k+l}$$

$$Fo'(x) = \begin{cases} \dfrac{F(x) - F(-t+x)}{2} & \text{if } t > x \geq 0 \\ \dfrac{F(x) - F(t+x)}{2} & \text{if } -t \leq x < 0 \end{cases},$$

where F is the first function, and Fo' is the second function, and the second polynomial is represented as $F_{fe}$ satisfying $$F_{fe}(X) = \sum_{k=0}^{t-1}\left(\frac{Fe'(k+0.5)}{2t} + \frac{1}{4t}\right)\sum_{l=0}^{n/t-1} X^{\frac{n}{t}k+l}$$

$$Fe'(x) = \begin{cases} \dfrac{F(x) + F(-t+x)}{2} & \text{if } t > x \geq 0 \\ \dfrac{F(x) + F(t+x)}{2} & \text{if } -t \leq x < 0 \end{cases},$$

where F is the first function, and Fe' is the third function.

7. The encryption processing device according to claim 1, wherein the process executed by the processor includes reducing the number of coefficients for a ciphertext used as input, prior to obtaining a new ciphertext by using a predetermined polynomial, and applying the predetermined polynomial to the ciphertext to obtain the new ciphertext.

8. The encryption processing device according to claim 1, wherein the process executed by the processor includes performing calculation of the first function to perform a process related to fuzzy authentication or fuzzy search which uses the ciphertext that has been input.

9. The encryption processing device according to claim 1, wherein the process executed by the processor further includes performing calculation of the first function to process a query for an encrypted database based on the ciphertext that has been input.

10. An encryption processing method of processing a ciphertext executed by a processor, the ciphertext being a fully homomorphic ciphertext that has a value obtained by adding an error with a predetermined variance to a predetermined value, as a plaintext associated with an integer and that enables a predetermined operation between integers to be performed without decryption, the method comprising:

preparing a first polynomial and a second polynomial respectively including a second function and a third function and the fourth polynomial and storing the first polynomial and the second polynomial, and the fourth polynomial in the storage device, the second function and the third function being generated by decomposing a first function as a calculation object;

rotating coefficients of the first polynomial based on a first ciphertext stored in the storage device to obtain the third polynomial, extracting a predetermined coefficient of the third polynomial to obtain a second ciphertext and storing the second ciphertext in the storage device;

rotating coefficients of the fourth polynomial based on the first ciphertext to obtain a fifth polynomial, extracting a predetermined coefficient of the fifth polynomial to obtain a fifth ciphertext, rotating coefficients of the second polynomial based on a sixth ciphertext obtained by homomorphically adding the first ciphertext and the fifth ciphertext, to obtain a sixth polynomial, extracting a predetermined coefficient of the sixth polynomial to obtain a third ciphertext and storing the third ciphertext in the storage device; and performing a homomorphic operation using the second ciphertext and the third ciphertext that are stored in the storage device to obtain a fourth ciphertext corresponding to a result of calculation of the first function using the first ciphertext as input.

11. A non-transitory computer-readable recording medium storing therein an encryption processing program for causing a processor to execute an encryption process of processing a ciphertext, the ciphertext being a fully homomorphic ciphertext that has a value obtained by adding an error with a predetermined variance to a predetermined value, as a plaintext associated with an integer and that enables a predetermined operation to be performed between integers without decryption, wherein the encryption process includes preparing a first polynomial and a second polynomial respectively including a second function and a third function and a fourth polynomial and storing the first polynomial and the second polynomial, and the fourth polynomial in the storage device, the second function and the third function being generated by decomposing a first function as a calculation object, rotating coefficients of the first polynomial based on a first ciphertext stored in the storage device to obtain the third polynomial, extracting a predetermined coefficient of the third polynomial to obtain a second ciphertext and storing the second ciphertext in the storage device, rotating coefficients of the fourth polynomial based on the first ciphertext to obtain a fifth polynomial, extracting a predetermined coefficient of the fifth polynomial to obtain a fifth ciphertext, rotating coefficients of the second polynomial based on a sixth ciphertext obtained by homomorphically adding the first ciphertext and the fifth ciphertext, to obtain a sixth polynomial, extracting a predetermined coefficient of the sixth polynomial to obtain a third ciphertext and storing the third ciphertext in the storage device, and performing a homomorphic operation using the second ciphertext and the third ciphertext that are stored in the storage device to obtain a fourth ciphertext corresponding to a result of calculation of the first function using the first ciphertext as input.

12. The encryption processing device according to claim 1, wherein the processor is an ASIC (Application Specific Integrated Circuit).

* * * * *